US012600577B2

(12) United States Patent　　　　(10) Patent No.: US 12,600,577 B2
Shimizu et al.　　　　　　　　　　　(45) Date of Patent: Apr. 14, 2026

(54) RUBBER PLUG SUPPLY DEVICE

(71) Applicant: Shinmaywa Industries, Ltd.,
　　　　　　Takarazuka (JP)

(72) Inventors: Nozomi Shimizu, Takarazuka (JP);
　　　　　　Masaru Hisano, Takarazuka (JP)

(73) Assignee: SHINMAYWA INDUSTRIES, LTD.,
　　　　　　Hyogo (JP)

( * ) Notice:　Subject to any disclaimer, the term of this
　　　　　　patent is extended or adjusted under 35
　　　　　　U.S.C. 154(b) by 165 days.

(21) Appl. No.:　18/284,187

(22) PCT Filed:　Mar. 17, 2022

(86) PCT No.:　PCT/JP2022/012399
　　　§ 371 (c)(1),
　　　(2) Date:　Sep. 26, 2023

(87) PCT Pub. No.:　WO2022/209979
　　　PCT Pub. Date: Oct. 6, 2022

(65)　　　　　Prior Publication Data
　　　US 2024/0174455 A1　　May 30, 2024

(30)　　　Foreign Application Priority Data
　　Mar. 30, 2021　(JP) ................................. 2021-058078

(51) Int. Cl.
　　　*B65G 47/14*　　　(2006.01)
(52) U.S. Cl.
　　　CPC ................................... *B65G 47/14* (2013.01)
(58) Field of Classification Search
　　　CPC ....... B23P 19/003; B23P 19/005; B23J 15/32;
　　　　　　　　　　　　　　　　　　　B65G 47/14
　　　　　　　　　　　(Continued)

(56)　　　　　References Cited

U.S. PATENT DOCUMENTS 4,044,462　A　*　8/1977　Anselmo ................... B21J 15/32
　　　　　　　　　　　　　　　　　　　　　　414/744.3
4,113,142　A　*　9/1978　Ryzhov ................... H01F 7/206
　　　　　　　　　　　　　　　　　　　　　　335/297
　　　　　　　　　　(Continued)

FOREIGN PATENT DOCUMENTS

CN　　　104058237　A　　9/2014
CN　　　207209274　U　　4/2018
　　　　　　　　(Continued)

OTHER PUBLICATIONS

Official Communication issued in International Patent Application
No. PCT/JP2022/012399, mailed on Jun. 7, 2022.
　　　　　　　　(Continued)

*Primary Examiner* — Rakesh Kumar
(74) *Attorney, Agent, or Firm* — Keating & Bennett, LLP

(57)　　　　　ABSTRACT

A rubber plug supply device 10 places a rotating body 40 in
a first rotation position R1 when it is detected by a sensor 25
that the orientation of a rubber plug 5 supplied is a first
orientation, and places the rotating body 40 in a second
rotation position R2 when it is detected that the orientation
of the rubber plug 5 is a second orientation, and then
supplies the rubber plug 5 to a first accommodating portion
41 or a second accommodating portion 42. The rubber plug
supply device 10 moves the rotating body 40 to the second
rotation position R2 or the first rotation position R1 after the
rubber plug 5 is supplied to the first accommodating portion
41 or the second accommodating portion 42. The rubber
plug supply device 10 dispenses the rubber plug 5 accom-
modated in the first accommodating portion 41 through a
rubber plug dispense port 41*b* that communicates with a
rubber plug supply port 41*a* or dispenses the rubber plug 5
accommodated in the second accommodating portion 42
through a rubber plug supply/eject port 42*a*.

11 Claims, 13 Drawing Sheets

(58) Field of Classification Search
USPC ....... 221/265, 190, 186, 1; 227/147; 29/809, 29/43.53
See application file for complete search history.

(56) References Cited

U.S. PATENT DOCUMENTS

| | | | | |
|---|---|---|---|---|
| 4,128,174 | A * | 12/1978 | Frisbie | B07C 5/36 198/408 |
| 4,141,457 | A * | 2/1979 | Nocek | G03B 27/06 414/737 |
| 4,593,845 | A * | 6/1986 | Andersson | B25B 23/06 227/138 |
| 4,819,326 | A * | 4/1989 | Stannek | H05K 13/0408 29/809 |
| 4,953,749 | A * | 9/1990 | Kubota | B65G 47/1407 221/202 |
| 4,960,195 | A * | 10/1990 | Yamaguchi | B65G 47/24 193/44 |
| 5,155,981 | A * | 10/1992 | Tordini | B65B 35/18 198/750.12 |
| 5,351,392 | A * | 10/1994 | Wing | B21J 15/323 29/818 |
| 5,385,434 | A * | 1/1995 | Quinn | B65G 47/24 406/73 |
| 5,480,087 | A * | 1/1996 | Young | B23P 19/003 221/68 |
| 5,752,306 | A * | 5/1998 | Clark | B23Q 11/006 29/524.1 |
| 6,113,529 | A * | 9/2000 | Shi | A61N 5/1007 600/7 |
| 6,398,007 | B1 * | 6/2002 | Yamada | B65G 47/256 406/87 |
| 6,951,298 | B1 * | 10/2005 | Cogley | B23P 19/003 227/112 |
| 7,051,900 | B2 * | 5/2006 | Reeves | F41B 11/55 221/24 |
| 7,347,342 | B2 * | 3/2008 | Grandy | A61H 39/08 606/189 |
| 7,934,355 | B2 * | 5/2011 | Strub | B65B 5/103 221/71 |
| 9,963,304 | B2 * | 5/2018 | Hodde | B65G 47/24 |
| 10,322,477 | B2 * | 6/2019 | Skolaude | B23P 19/006 |
| 10,569,371 | B2 * | 2/2020 | Wiethoff | B23P 19/002 |
| 2003/0226388 | A1 | 12/2003 | Matsuoka | |
| 2006/0196153 | A1 * | 9/2006 | Ishigure | B65G 47/145 221/113 |
| 2007/0170198 | A1 * | 7/2007 | Kvalheim | G07F 11/04 221/92 |
| 2007/0251804 | A1 * | 11/2007 | Hahnel | B65G 47/918 198/469.1 |
| 2009/0071973 | A1 * | 3/2009 | Hester | B23P 19/003 221/190 |
| 2024/0174455 | A1 * | 5/2024 | Shimizu | B65G 47/14 |

FOREIGN PATENT DOCUMENTS

| | | |
|---|---|---|
| CN | 209777484 U | 12/2019 |
| CN | 112537621 A | 3/2021 |
| JP | 60-159725 U | 10/1985 |
| JP | 2-34516 U | 3/1990 |
| JP | 2004-025188 A | 1/2004 |
| JP | 4958932 B2 | 6/2012 |
| WO | 2021/029176 A1 | 2/2021 |

OTHER PUBLICATIONS

Official Communication issued in corresponding Chinese Patent Application No. 202280025858.6, mailed on Jun. 13, 2025, 7 pages.
Official Communication issued in corresponding Chinese Patent Application No. 202280025858.6, mailed on Nov. 14, 2025, 4 pages.

* cited by examiner

RUBBER PLUG SUPPLY DEVICE

TECHNICAL FIELD

The present invention relates to a rubber plug supply device.

BACKGROUND ART

A rubber plug supply device has been known in the art that supplies a waterproofing rubber plug to be inserted into an electric wire to a rubber plug insertion device, or the like. FIG. 2 is a perspective view of an example of a rubber plug. FIG. 3 is a view showing an example of how a rubber plug is used. As shown in FIG. 3, a rubber plug 5 is attached, for example, to a sheathed electric wire 6 to which a crimp terminal 7 is crimped at its tip. As shown in FIG. 2, rubber plugs include those having a cylindrical shape that is asymmetrical in the up-down direction.

For example, when supplying rubber plugs shown in FIG. 2 to a rubber plug insertion device, it is necessary to supply the rubber plugs while aligning the orientations of the rubber plugs. Rubber plug supply devices that supply rubber plugs to other devices while aligning the orientations of the rubber plugs have been known in the art. For example, PTL 1 discloses a rubber plug supply device including a rotating body provided with an accommodating hole for a rubber plug, a sensor that detects the orientation of the rubber plug accommodated in the accommodating hole, and a dispense device that dispenses the accommodated rubber plug from the accommodating hole. With the rubber plug insertion device described above, a rubber plug is inserted into the accommodating hole when the rotating body is positioned in the third rotation position in which the rubber plug can be inserted into the accommodating hole. Thereafter, the orientation of the rubber plug in the accommodating hole is detected, and the rotating body is rotated based on the detection result of the orientation of the rubber plug. The rotating body moves to the first rotation position or the second rotation position, which are 180 degrees apart from each other, depending on the orientation of the rubber plug. This aligns orientations of rubber plugs accommodated in the accommodating hole. Rubber plugs whose orientations have been aligned are dispensed from the accommodating hole by the dispense device. Thus, rubber plugs whose orientations are aligned can be supplied to devices.

CITATION LIST

Patent Literature

PTL 1: WO/2021/029176

SUMMARY OF INVENTION

Technical Problem

In the rubber plug supply device disclosed in PTL 1, the rotating body is moved between three rotation positions. The three-position control of the rotating body is difficult to achieve without using an actuator capable of measuring the rotation angle or combining multiple actuators to make complex movements. PTL 1 illustrates a rotary actuator as an example of an actuator that rotates the rotating body. However, actuators capable of measuring the rotation angle, e.g., rotary actuators and servo motors, are expensive. Combining multiple actuators requires a complicated control and configuration.

The present invention has been made in view of these points, and an object thereof is to provide a rubber plug supply device that can align the orientation of rubber plugs with a simple and inexpensive configuration.

Solution to Problem

A rubber plug supply device according to the present invention includes: a supply device that supplies a rubber plug; a sensor that is provided in the supply device to determine whether an orientation of the rubber plug supplied is a first orientation or a second orientation, which is opposite to the first orientation; a rotating body that includes a rotation shaft and includes a first accommodating portion and a second accommodating portion each being capable of accommodating the rubber plug supplied from the supply device; a driver device that rotates the rotating body around the rotation shaft; a dispense device that dispenses the rubber plug accommodated in the first accommodating portion or the second accommodating portion; and a controller connected to the supply device, the sensor, the driver device and the dispense device. The first accommodating portion includes a rubber plug supply port, a rubber plug dispense port and a rubber plug passage. The rubber plug supply port is connected to the supply device when the rotating body is in a first rotation position around the rotation shaft. The rubber plug dispense port is connected to the dispense device when the rotating body is in a second rotation position around the rotation shaft. The rubber plug passage is configured so that the rubber plug can pass therethrough and connects between the rubber plug supply port and the rubber plug dispense port. The second accommodating portion includes a rubber plug supply/eject port that is connected to the dispense device when the rotating body is in the first rotation position and connected to the supply device when the rotating body is in the second rotation position. The controller includes a first rotation controller, a supply controller, a second rotation controller and a dispense controller. The first rotation controller places the rotating body in the first rotation position when it is detected by the sensor that the orientation of the rubber plug is the first orientation, and places the rotating body in the second rotation position when it is detected that the orientation of the rubber plug is the second orientation. The supply controller supplies the rubber plug to the first accommodating portion or the second accommodating portion after the rotating body is placed in the first rotation position or the second rotation position by the first rotation controller. The second rotation controller moves the rotating body to the second rotation position or the first rotation position after the rubber plug is supplied to the first accommodating portion or the second accommodating portion. After the rotating body is moved by the second rotation controller, the dispense controller dispenses the rubber plug accommodated in the first accommodating portion through the rubber plug dispense port or dispenses the rubber plug accommodated in the second accommodating portion through the rubber plug supply/eject port.

With the rubber plug supply device described above, the orientation of the rubber plug is detected by the sensor before the rubber plug is accommodated in the rotating body. The rubber plug is accommodated in the first accommodating portion or the second accommodating portion of the rotating body depending on the detected orientation. The rubber plug in the first orientation is accommodated in the first accommodating portion when the rotating body is in the first rotation position, and is dispensed through the rubber plug passage and the rubber plug dispense port after the rotating body is moved to the second rotation position. In the second position of the rotating body, the rubber plug dispense port of the first accommodating portion is connected to the dispense device. Then, the rubber plug in the first orientation is dispensed in the same orientation as when supplied to the rotating body. On the other hand, the rubber plug in the second orientation is accommodated in the second accommodating portion when the rotating body is in the second rotation position, and is dispensed by being moved back toward the rubber plug supply/eject port after the rotating body is moved to the first rotation position. In the first position of the rotating body, the rubber plug supply/eject port of the second accommodating portion is connected to the dispense device. Thus, the rubber plug in the second orientation is dispensed in the orientation reversed from that when supplied to the rotating body.

Thus, the rotating body of the rubber plug supply device includes two accommodating portions with different rubber plug dispense directions. Before a rubber plug is accommodated in the rotating body, the orientation thereof is detected, and the rubber plug is supplied to one of the two accommodating portions depending on the detected orientation. With the rubber plug supply device described above, the first rotation position is the position to supply the rubber plug for the first accommodating portion and is the position to dispense the rubber plug for the second accommodating portion. The second rotation position is the position to dispense the rubber plug for the first accommodating portion and is the position to supply the rubber plug for the second accommodating portion. Therefore, with such a configuration, it is possible to align the orientation of the rubber plug by moving the rotating body between two positions, i.e., the first rotation position and the second rotation position. The two-position control of the rotating body can be realized simply and at low cost by, for example, opposite stroke ends of one single-acting actuator, a stopper, etc. Thus, with the rubber plug supply device described above, it is possible to align the orientation of the rubber plug with a simple and inexpensive configuration.

According to a preferred embodiment of the present invention, the driver device includes: an actuator including a rod that extends/retracts; a link member that links together the rod and the rotating body so that the rod is movable relative to the rotating body; and a support member that supports the actuator so that the actuator can swing or move in response to extension/retraction of the rod.

With such an embodiment, the rotating body can be rotated by a relatively simple actuator that includes a rod that extends/retracts.

According to a preferred embodiment of the present invention, the rotating body is in the first rotation position when the rod is at one stroke end. The rotating body is in the second rotation position when the rod is at the other stroke end.

With such an embodiment, since the first rotation position and the second rotation position of the rotating body can be determined using the stroke ends of the rod of the actuator, it is possible to further simplify the configuration of the driver device.

According to a preferred embodiment of the present invention, an angular shift around the rotation shaft between the first rotation position and the second rotation position is 90 degrees or less.

With such an embodiment, it is possible to align the orientation of the rubber plug by rotating the rotating body only by an angle of 90 degrees or less. For example, it is necessary to rotate the rotating body in either rotation direction by 90 degrees in order to align the orientation of the rubber plug with the rubber plug supply device disclosed in PTL 1. It is possible to reduce the cycle time for aligning the orientation of the rubber plug as the necessary rotation angle is smaller. As described in detail below, according to a preferred embodiment of the present invention, the angular shift between the first rotation position and the second rotation position around the rotation shaft can be 90 degrees or less. Thus, it is possible to reduce the cycle time for aligning the orientation of the rubber plug.

According to a preferred embodiment of the present invention, an angular shift around the rotation shaft between the first rotation position and the second rotation position is 90 degrees. An angular shift around the rotation shaft between the rubber plug supply port and the rubber plug supply/eject port is 90 degrees. An angular shift around the rotation shaft between the rubber plug supply port and the rubber plug dispense port is 180 degrees.

With such an embodiment, the position of the rubber plug dispense port when the rotating body is in the second rotation position coincides with the position of the rubber plug supply/eject port when the rotating body is in the first rotation position. Therefore, only one rubber plug route of the dispense device is required. According to one preferred embodiment of such embodiments, the dispense device includes a dispense pipe that is connected to the rubber plug supply/eject port of the second accommodating portion when the rotating body is in the first rotation position, and connected to the rubber plug dispense port of the first accommodating portion when the rotating body is in the second rotation position. According to this embodiment, the dispense device includes the dispense pipe as the rubber plug route, and rubber plug is dispensed without passing through a rubber plug route other than the dispense pipe.

According to a preferred embodiment of the present invention, the dispense device further includes an air jet port that jets compressed air. The rubber plug supply port of the first accommodating portion is connected to the air jet port when the rotating body is in the second rotation position. The rotating body has an air passage including a first end portion that is connected to the air jet port when the rotating body is in the first rotation position and a second end portion that is connected to the second accommodating portion. The air passage is provided to extend avoiding the rubber plug passage of the first accommodating portion.

With such an embodiment, since the first accommodating portion and the air passage is not linked together, when compressed air is supplied to one of the first accommodating portion and the air passage, compressed air does not flow to the other one of the first accommodating portion and the air passage. Therefore, it is possible to prevent the compressed air dispense capacity from lowering, and to reduce the amount of wasted compressed air.

According to a preferred embodiment of the present invention, the dispense device includes a first jet port and a second jet port each configured to jet compressed air. The first jet port is connected to the rubber plug supply port of the first accommodating portion when the rotating body is in the second rotation position. The rotating body has an air passage including a first end portion that is connected to the second jet port when the rotating body is in the first rotation position and a second end portion that is connected to the second accommodating portion.

With such an embodiment, compressed air is supplied to the first accommodating portion through the first jet port, and compressed air is supplied to the second accommodating portion through the second jet port via the air passage. With such an embodiment, the structure of the air passage can be simplified because the compressed air is supplied to the first accommodating portion and the second accommodating portion from different systems. For example, the structure of the air passage is likely to become complicated when using a single system of compressed air and providing the air passage to extend avoiding the rubber plug passage of the first accommodating portion. When the system for supplying compressed air to the second accommodating portion is separated from the system for supplying compressed air to the first accommodating portion, it is no longer necessary to provide a special structure in the air passage to avoid the rubber plug passage in the first accommodating portion. Therefore, it is possible to avoid complicating the structure of the rotating body.

According to a preferred embodiment of the present invention, the dispense device includes an air jet port configured to jet compressed air. The rotating body includes a first air passage and a second air passage. One end of the first air passage is connected to the first accommodating portion. The other end of the first air passage is connected to the air jet port when the rotating body is in the second rotation position. One end of the second air passage is connected to the second accommodating portion. The other end of the second air passage is connected to the air jet port when the rotating body is in the first rotation position.

With such an embodiment, unlike the embodiment in which compressed air is supplied to the first accommodating portion through the rubber plug supply port, the other end of the first air passage, which is the inlet of the compressed air, can be arranged relatively freely. Therefore, it is possible to arrange the other end of the first air passage so that the structure of the second air passage is simplified. Therefore, it is possible to avoid complicating the structure of the rotating body, and only one system can be used for supplying compressed air.

According to a preferred embodiment of the present invention, the dispense device includes: a dispense pipe that is connected to the rubber plug dispense port of the first accommodating portion when the rotating body is in the second rotation position, and through which the rubber plug dispensed from the first accommodating portion passes; and a depressurization device that depressurizes inside of the dispense pipe. The dispense controller drives the depressurization device when dispensing the rubber plug accommodated in the first accommodating portion from the first accommodating portion.

With such an embodiment, it is possible to reduce the amount of time required to carry the rubber plug out of the first accommodating portion. The first accommodating portion is long because it runs through the rotating body. Therefore, the amount of time required to carry the rubber plug out of the first accommodating portion is likely to become longer due to friction between the first accommodating portion and the rubber plug. With such an embodiment, negative pressure that moves the rubber plug toward the dispense pipe is generated in the dispense pipe by driving the depressurization device. Thus, carrying the rubber plug out of the first accommodating portion is assisted, and it is possible to reduce the amount of time required for carrying out the rubber plug.

According to a preferred embodiment of the present invention, the rubber plug supply port and the rubber plug dispense port are provided symmetrical relative to the rubber plug supply/eject port with respect to the rotation position around the rotation shaft.

With such an embodiment, the position of the rubber plug dispense port when the rotating body is in the second rotation position coincides with the position of the rubber plug supply/eject port when the rotating body is in the first rotation position. Therefore, only one dispense pipe is needed for the rubber plug route of the dispense device.

Effects of Invention

With the rubber plug supply device according to the present invention, it is possible to align the orientation of rubber plugs with a simple and inexpensive configuration.

DESCRIPTION OF EMBODIMENTS

[Configuration of Rubber Plug Supply Device]

Figure 1:
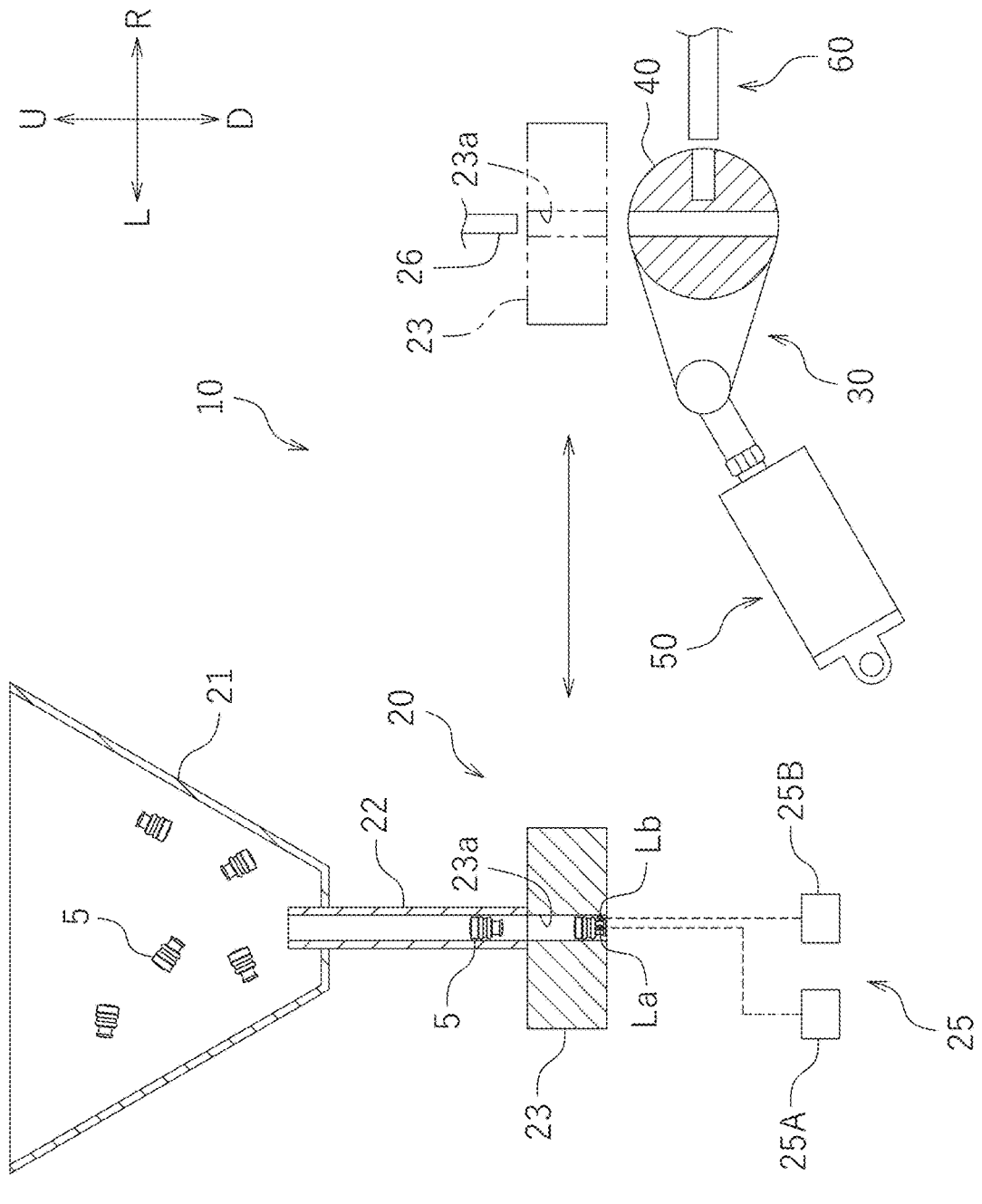
FIG. 1 is a schematic cross-sectional view of a rubber plug supply device according to one embodiment.

An embodiment of the present invention will now be described with reference to the drawings. FIG. 1 is a schematic cross-sectional view of a rubber plug supply device 10 according to one embodiment. The rubber plug supply device 10 supplies the rubber plug 5, one by one, to another device, e.g., a rubber plug insertion device (not shown). In the following description, unless otherwise specified, the front side of the paper in FIG. 1 will be referred to as the front side of the rubber plug supply device 10. The terms "left", "right", "up" and "down" refer to these directions as the rubber plug supply device 10 is viewed from the front side. The designations F, Rr, L, R, U and D, as used in the figures, refer to front, rear, left, right, up and down, respectively. Unless otherwise specified, the rotation direction in the description refers to the rotation direction as viewed from the front side of the rubber plug supply device 10. Note however that the direction is defined merely for the purpose of discussion, but in no way limits the manner in which the rubber plug supply device 10 is installed and in no way limits the present invention.

Figure 2:
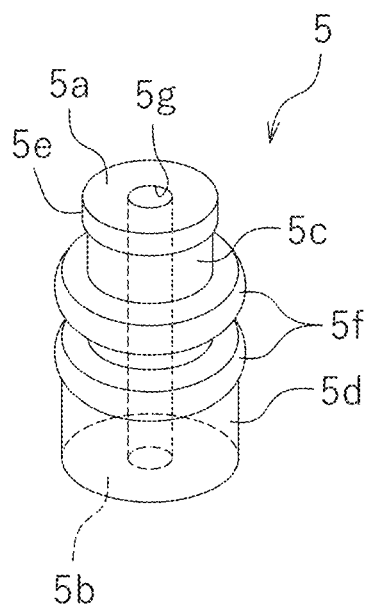
FIG. 2 is a perspective view of a rubber plug.

As shown in FIG. 2, the rubber plug 5 of the present embodiment has a cylindrical shape that is asymmetrical for the axial direction. The rubber plug 5 includes a small diameter portion 5c and a large diameter portion 5d. The diameter of the large diameter portion 5d is larger than the diameter of the small diameter portion 5c. Formed at the tip of the small diameter portion 5c is a ring portion 5e whose diameter is slightly larger than that of the small diameter portion 5c. Two ring portions 5f whose diameter is slightly larger than that of the large diameter portion 5d are formed in the vicinity of a portion of the large diameter portion 5d that connects to the small diameter portion 5c. Hereinafter, the end portion of the rubber plug 5 on the side of the small diameter portion 5c will be as appropriate referred to as a front end 5a of the rubber plug 5. Hereinafter, the end portion of the rubber plug 5 on the side of the large diameter portion 5d will be as appropriate referred to a rear end 5b of the rubber plug 5. The front end 5a is an end portion that faces forward in the dispense direction when a rubber plug is dispensed to another device by the rubber plug supply device 10. The rear end 5b is an end portion that faces rearward in the dispense direction when a rubber plug is dispensed to another device by the rubber plug supply device 10. The rubber plug 5 has a through hole 5g that runs from the front end 5a to the rear end 5b. Note however that the shape of the rubber plug 5 shown here is merely an example, and there is no limitation on the shape of the rubber plug 5.

Figure 3:
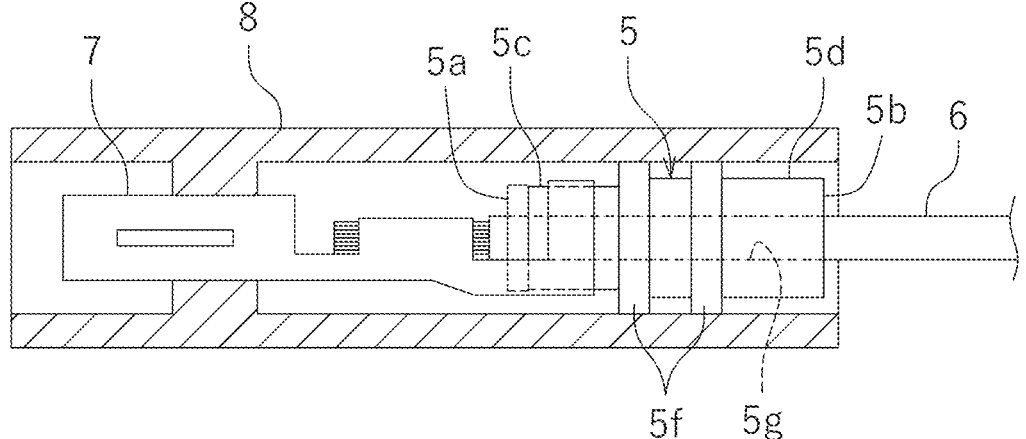
FIG. 3 is a view showing an example of how a rubber plug is used.

As shown in FIG. 3, the rubber plug 5 is attached to a sheathed electric wire 6 (hereinafter referred to as the electric wire 6), for example. The tip of the electric wire 6 is inserted into the through hole 5g of the rubber plug 5. The electric wire 6 is inserted into the through hole 5g through the opening at the rear end 5b and taken out through the opening at the front end 5a. Then, the sheath of the tip portion of the electric wire 6 is stripped, and the crimp terminal 7 is crimped onto the tip portion. In this process, by the crimping of the crimp terminal 7, the rubber plug 5 is also secured to the electric wire 6. The assembly of the electric wire 6, the rubber plug 5 and the crimp terminal 7 is inserted into a dedicated housing 8. As shown in FIG. 3, the ring portion 5f of the rubber plug 5 contacts the inner circumference of the housing 8, thereby preventing moisture from entering the housing 8. The rubber plug 5 is a waterproofing rubber plug. Note however that how the rubber plug 5 shown here is used is merely an example, and there is no limitation on how the rubber plug 5 is used.

The rubber plug supply device 10 dispenses the rubber plug 5 to another device with the orientation aligned so that the front end 5a thereof facing forward in the dispense direction. The rubber plug supply device 10 has the function of aligning the orientation of the rubber plugs 5 provided in random orientations. As shown in FIG. 1, the rubber plug supply device 10 includes a supply device 20, an orientation adjustment device 30, a dispense device 60, and a control device 100 (see FIG. 7) that controls their operation. The supply device 20 supplies the rubber plug 5 to the orientation adjustment device 30. The supply device 20 also includes a sensor 25 that detects the orientation of the rubber plug 5. The orientation adjustment device 30 aligns the orientation of the rubber plug 5 based on the orientation of the rubber plug 5 detected by the sensor 25. The dispense device 60 dispenses the rubber plug 5, whose orientation has been aligned by the orientation adjustment device 30, to another device.

As shown in FIG. 1, the supply device 20 includes a supply vat 21, a supply pipe 22, a moving plate 23 that transports the rubber plug 5 to a position upward of the orientation adjustment device 30, the sensor 25, and an insertion pin 26 that pushes the rubber plug 5 into a rotating body 40 of the orientation adjustment device 30. The supply vat 21 is a box-shaped member that accommodates a large number of rubber plugs 5. The large number of rubber plugs 5 are delivered in a container, such as a plastic bag, for example. The large number of rubber plugs 5 are transferred from this container to the supply vat 21. In this process, the orientation of the many rubber plugs 5 in the supply vat 21 is not constant. The bottom surface of the supply vat 21 is sloped toward the center. The supply pipe 22 is connected to the central portion of the bottom surface of the supply vat 21. The rubber plugs 5, which have gathered in the central portion of the bottom surface due to the slope of the bottom surface of the supply vat 21, fall into the supply pipe 22. The supply pipe 22 is configured in a cylindrical shape and extends in the up-down direction. The inner diameter of the supply pipe 22 is set to be slightly larger than the outer diameter of the rubber plug 5. The supply pipe 22 is formed thick enough to allow the rubber plug 5 to pass through either the front end 5a or the rear end 5b toward the front side in the direction of travel. The rubber plugs 5 are supplied one by one downstream through the supply pipe 22. The orientation of the rubber plug 5 is corrected by passing through the supply tube 22 so that the front end 5a or the rear end 5b faces forward in the direction of travel.

The moving plate 23 is provided downward of the supply tube 22. The moving plate 23 is moved in the left-right direction by a plate actuator 24 (see FIG. 7). The plate actuator 24 is, for example, an air cylinder. Note however that there is no particular limitation on the type of the plate actuator 24. FIG. 1 shows the moving plate 23 being in the left end position. The moving plate 23 has a retaining hole 23a located downward of the supply pipe 22 when being in the left end position. The retaining hole 23a penetrates the moving plate 23 in the up-down direction. With the moving plate 23 being in the left end position, the rubber plug 5 is accommodated in the retaining hole 23a. The rubber plug 5 is pushed into the retaining hole 23a by pressurizing the inside of the supply tube 22 with compressed air, for example.

The sensor 25 for detecting the orientation of the rubber plug 5 is provided is provided before and after the retaining hole 23a. The sensor 25 herein detects the orientation of the rubber plug 5 when being accommodated in the retaining hole 23a. Note however that the sensor 25 only needs to detect the orientation of the rubber plug 5 before the rubber plug 5 is accommodated in the orientation adjustment device 30, and the timing of detection is not further limited. The sensor 25 herein consists of an arrival checking sensor 25A and the orientation detection sensor 25B. The arrival checking sensor 25A and an orientation detection sensor 25B are both optical sensors. The arrival checking sensor 25A and an orientation detection sensor 25B each include a light emitter and a light receiver. The light emitter of the arrival checking sensor 25A emits light with the optical axis La in the horizontal direction. The light receiver of the arrival checking sensor 25A is configured to receive light emitted by the light emitter. When the rubber plug 5 is accommodated in the retaining hole 23A, the light emitted by the light emitter of the arrival checking sensor 25A is blocked by the rubber plug 5 and does not reach the light receiver. As a result, it is detected that the rubber plug 5 is accommodated in the retaining hole 23A.

The light emitter of the orientation detection sensor 25B emits light with the optical axis Lb in the horizontal direction. The light receiver of the orientation detection sensor 25B is configured to receive the light emitted by the light emitter. When the rubber plug 5 is accommodated in the retaining hole 23a so that the front end 5a faces downward (hereinafter, this direction of the rubber plug 5 will be referred to also as the forward orientation), the light emitted by the light emitter of the orientation detection sensor 25B passes through the side of the small diameter portion 5c to reach the light receiver. On the other hand, although not shown in the figures, when the rubber plug 5 is accommodated in the retaining hole 23a so that the front end 5a faces upward (hereinafter, this direction of the rubber plug 5 will be referred to also as the reverse orientation), the light emitted by the light emitter of the orientation detection sensor 25B is blocked by the large diameter portion 5d and does not reach the light receiver. The sensor 25 is configured to detect whether the orientation of the rubber plug 5 is in the forward orientation or in the reverse orientation, opposite to the forward orientation, based on whether light is received by the arrival checking sensor 25A and the orientation detection sensor 25B. Specifically, the sensor 25 detects that the orientation of the rubber plug 5 is the forward orientation when the arrival checking sensor 25A is not receiving light and the orientation detection sensor 25B is receiving light. The sensor 25 detects that the orientation of the rubber plug 5 is the reverse orientation when the arrival checking sensor 25A and the orientation detection sensor 25B are both not receiving light. Note however that there is no particular limitation on the method of detecting the orientation of the rubber plug 5 by the sensor 25.

Figure 4:
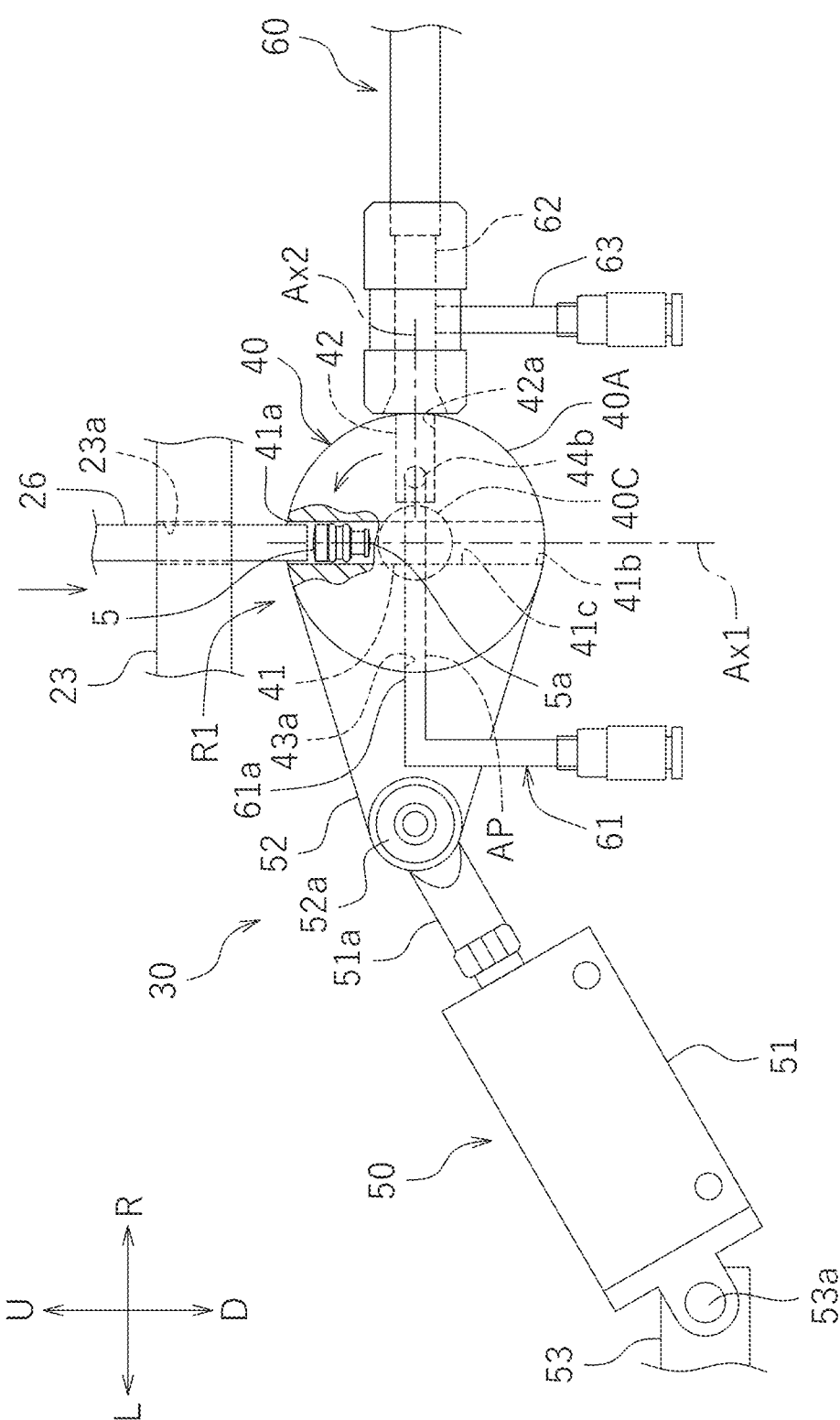
FIG. 4 is a partially-cutaway front view of an orientation adjustment device in the first rotation position.

FIG. 4 shows the moving plate 23 positioned in the right end position and the insertion pin 26. The moving plate 23 transports the rubber plug 5 retained in the retaining hole 23a to a position downward of the insertion pin 26. The insertion pin 26 is configured to be movable in the up-down direction. The insertion pin 26 is provided at a position that overlaps the retaining hole 23a when the moving plate 23 is in the right end position as viewed from above. The supply device 20 includes an insertion actuator 27 (see FIG. 7) that moves the insertion pin 26 in the up-down direction. The insertion actuator 27 is an air cylinder, for example. Note however that there is no particular limitation on the type of the insertion actuator 27. By driving the insertion actuator 27 to move the insertion pin 26 downward, the rubber plug 5 in the retaining hole 23a is pushed into the rotating body 40 of the orientation adjustment device 30. This movement will be later described in detail.

FIG. 4 is a partially-cutaway front view of the orientation adjustment device 30. FIG. 4 is a view of the orientation adjustment device 30 when the rotating body 40 is in the first rotation position R1 (to be later described in detail). As shown in FIG. 4, the orientation adjustment device 30 includes the rotating body 40 and a driver device 50 that rotates the rotating body 40.

Figure 5:
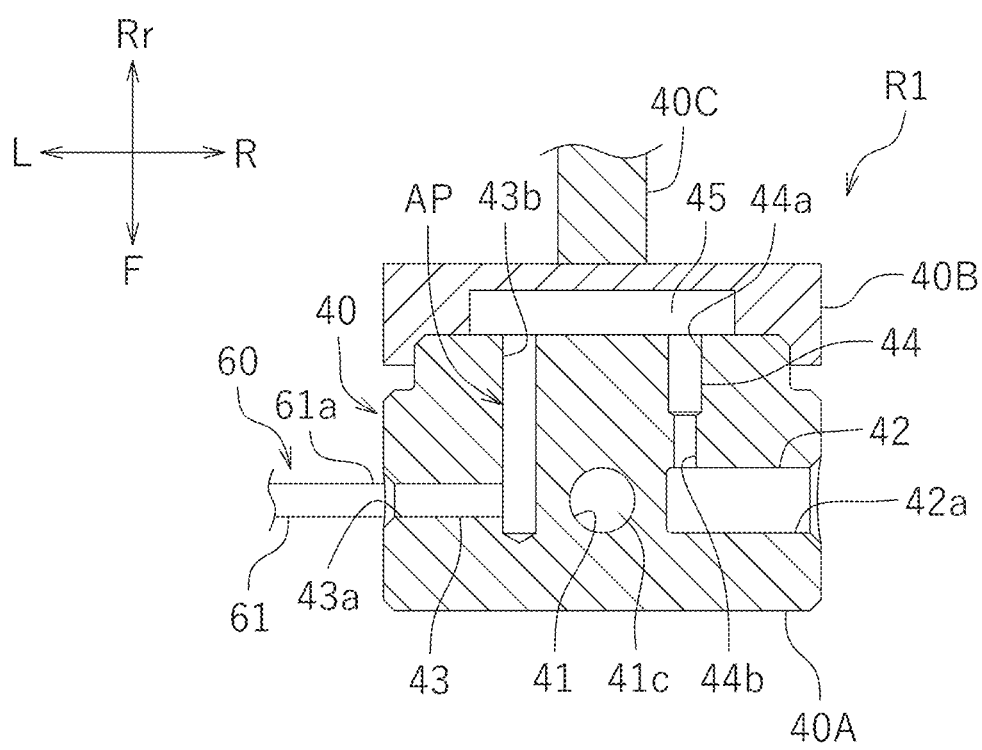
FIG. 5 is a cross-sectional view showing a rotating body cut in a horizontal direction.

FIG. 5 is a cross-sectional view of the rotating body 40 taken along the horizontal direction. As shown in FIG. 5, the rotating body 40 includes a holder 40A, a rotary shaft 40B and a rotation shaft 40C. The holder 40A is the main body portion of the rotating body 40 provided with a first accommodating portion 41 and a second accommodating portion 42 capable of accommodating the rubber plugs 5 supplied from the supply device 20. The rotary shaft 40B that supports the holder 40A is provided rearward of the holder 40A. The rotation shaft 40C rotatably supports the rotary shaft 40B. As shown in FIG. 5, the rotation shaft 40C extends in the front-rear direction. The holder 40A rotates around the rotation shaft 40C together with the rotary shaft 40B.

As shown in FIG. 4, the holder 40A is configured in a circular plate shape as viewed from the axial direction of the rotation shaft 40C (herein, the front-rear direction). The center of the holder 40A is aligned with the rotation shaft 40C. The holder 40A includes the first accommodating portion 41 and the second accommodating portion 42 that accommodate the rubber plug 5. The first accommodating portion 41 is a through hole extending through the holder 40A in the radial direction. Herein, the first accommodating portion 41 is a straight hole extending along one axis Ax1. The first accommodating portion 41 extends through the center of the holder 40A (also on the rotation shaft 40C and thus the center of rotation of the holder 40A) as viewed from the front-rear direction. The opposite end portions 41a and 41b of the first accommodating portion 41 have openings in the peripheral portion of the holder 40A as viewed from the rotation axis direction. As shown in FIG. 5, the first accommodating portion 41 has a circular cross section. The diameter of the first accommodating portion 41 corresponds to the diameter of the largest diameter portion of the rubber plug 5 (herein, the ring portion 5f).

As shown in FIG. 4, an axis Ax1 of the first accommodating portion 41 is oriented in the up-down direction when the rotating body 40 is placed in the first rotation position R1. At this time, one end portion 41a of the first accommodating portion 41 is facing upward and is located downward of the moving plate 23. The end portion 41a of the first accommodating portion 41 is the opening through which the rubber plug 5 enters when the rubber plug 5 is accommodated in the first accommodating portion 41. Hereinafter, the end portion 41a of the first accommodating portion 41 will be referred to also as a rubber plug supply port 41a. The rubber plug supply port 41a is connected to the retaining hole 23a of the supply device 20 when the rotating body 40 is in the first rotation position R1 around the rotation shaft 40C and the moving plate 23 is in the right end position. The other end portion 41b of the first accommodating portion 41 is an opening through which the rubber plug 5 passes when the rubber plug 5 is dispensed from the first accommodating portion 41. Hereinafter, the other end portion 41*b* of the first accommodating portion 41 will be referred to also as a rubber plug dispense port 41*b*. When the rotating body 40 is placed in the first rotation position R1, the rubber plug dispense port 41*b* faces downward. The angular shift between the rubber plug supply port 41*a* and the rubber plug dispense port 41*b* around the rotation shaft 40C is 180 degrees. The portion of the first accommodating portion 41 between the rubber plug supply port 41*a* and the rubber plug dispense port 41*b* forms a rubber plug passage 41*c* through which the rubber plug 5 passes when dispensing the rubber plug 5. The rubber plug passage 41*c* is a passage that connects between the rubber plug supply port 41*a* and the rubber plug dispense port 41*b*, and is configured so that the rubber plug 5 can pass therethrough.

The second accommodating portion 42 is a non-penetrating recess having an opening 42*a* in the peripheral portion of the holder 40A as viewed from the rotation axis direction. The second accommodating portion 42 is recessed in the radial direction of the holder 40A from the opening 42*a*. The depth of the second accommodating portion 42 from the peripheral portion of the holder 40A is slightly longer than the length of the rubber plug 5 in the axial direction. The second accommodating portion 42 is formed to such a depth that it does not intersect the first accommodating portion 41. The second accommodating portion 42 also has a circular cross section. The diameter of the second accommodating portion 42 also corresponds to the diameter of the largest diameter portion of the rubber plug 5. As shown in FIG. 4, the axis Ax2 of the second accommodating portion 42 is oriented in the left-right direction when the rotating body 40 is placed in the first rotation position R1. The axis Ax2 of the second accommodating portion 42 is orthogonal to the axis Ax1 of the first accommodating portion 41. The opening 42*a* in the peripheral portion of the second accommodating portion 42 faces rightward when the rotating body 40 is placed in the first rotation position R1. The angular shift between the end portion 42*a* and the rubber plug supply port 41*a* around the rotation shaft 40C and the angular shift between the end portion 42*a* and the rubber plug dispense port 41*b* are both 90 degrees. The opening 42*a* is an opening through which the rubber plug 5 passes when accommodating the rubber plug 5 in the second accommodating portion 42 and when dispensing the rubber plug 5 from the second accommodating portion 42. Hereinafter, the end portion 42*a* of the second accommodating portion 42 will be referred to also as the rubber plug supply/eject port 42*a*.

A portion of an air passage AP, which communicates with the second accommodating portion 42 and through which compressed air passes, is formed in the holder 40A. As shown in FIG. 5, the holder 40A includes an upstream passage 43 and a downstream passage 44 as a part of the air passage AP. The upstream passage 43 is formed to extend from the peripheral portion of the holder 40A toward the radial direction of the holder 40A and then is bent toward the rear side (toward the rotary shaft 40B). Compressed air is supplied from the dispense device 60 to the end portion 43*a* (hereinafter referred to also as the air inlet port 43*a*) of the upstream passage 43 that has an opening in the peripheral portion of the holder 40A. The air inlet port 43*a* is facing leftward when the rotating body 40 is placed in the first rotation position R1. The other end portion 43*b* of the upstream passage 43 has an opening on the back surface of the holder 40A. The downstream passage 44 communicates between the second accommodating portion 42 and the back surface of the holder 40A. The downstream passage 44 extends forward from the end portion 44*a* that has an opening on the back surface of the holder 40A and reaches the second accommodating portion 42. Hereinafter, the end portion of the downstream passage 44 connected to the second accommodating portion 42 will be referred to also as an air outlet port 44*b*.

The rotary shaft 40B is in contact with the back surface of the holder 40A. A part of the air passage AP is formed also in the rotary shaft 40B. A bypass passage 45 is formed in the rotary shaft 40B as a part of the air passage AP. The bypass passage 45 is a groove provided on the front surface of the rotary shaft 40B, and overlaps with the end portion 43*b* on the back surface side of the upstream passage 43 and the end portion 44*a* on the back surface side of the downstream passage 44, as viewed from the front-rear direction. The bypass passage 45 is connected to the end portion 43*b* on the back surface side of the upstream passage 43 and the end portion 44*a* on the back surface side of the downstream passage 44, thus making a connection therebetween. With the bypass passage 45, the air inlet port 43*a* of the air passage AP and the second accommodating portion 42 communicate with each other. As shown in FIG. 5, the air passage AP is formed to extend avoiding the rubber plug passage 41*c* of the first accommodating portion 41.

The driver device 50 is a mechanism for rotating the rotating body 40 around the rotation shaft 40C. As shown in FIG. 4, the driver device 50 includes an actuator 51, a link member 52 that links together the actuator 51 and the rotating body 40, and a support member 53 supporting the actuator 51. The actuator 51 is herein an air cylinder with a rod 51*a* that extends/retracts. Note however that the actuator 51 is not limited to an air cylinder. The actuator 51 may be an electromagnetic cylinder with a rod that extends/retracts.

The link member 52 links together the rod 51*a* of the actuator 51 and the rotating body 40 so that the rod 51*a* is movable relative to the rotating body 40. The link member 52 is non-rotatably secured to the rotating body 40, and is rotatably linked to the rod 51*a*. The link member 52 includes a rotation shaft 52*a* at the tip portion, i.e., at the peripheral portion when rotating with the rotating body 40. The tip portion of the rod 51*a* is rotatably linked to the rotation shaft 52*a*. The support member 53 supports the actuator 51 so that it can swing in response to the extension/retraction of the rod 51*a*. The support member 53 supports the end portion of the actuator 51 opposite to the side on which the rod 51*a* is provided so that the support member 53 can swing. The support member 53 includes a swing shaft 53*a* around which the actuator 51 swings. The actuator 51 is capable of swinging, or pivoting, around the swing shaft 53*a*. Therefore, as the rod 51*a* of the actuator 51 extends/retracts, the rotating body 40 rotates. Note that the support member 53 may support the actuator 51 not so that the actuator 51 can swing but so that the actuator 51 can move (e.g., can slide).

Figure 6:
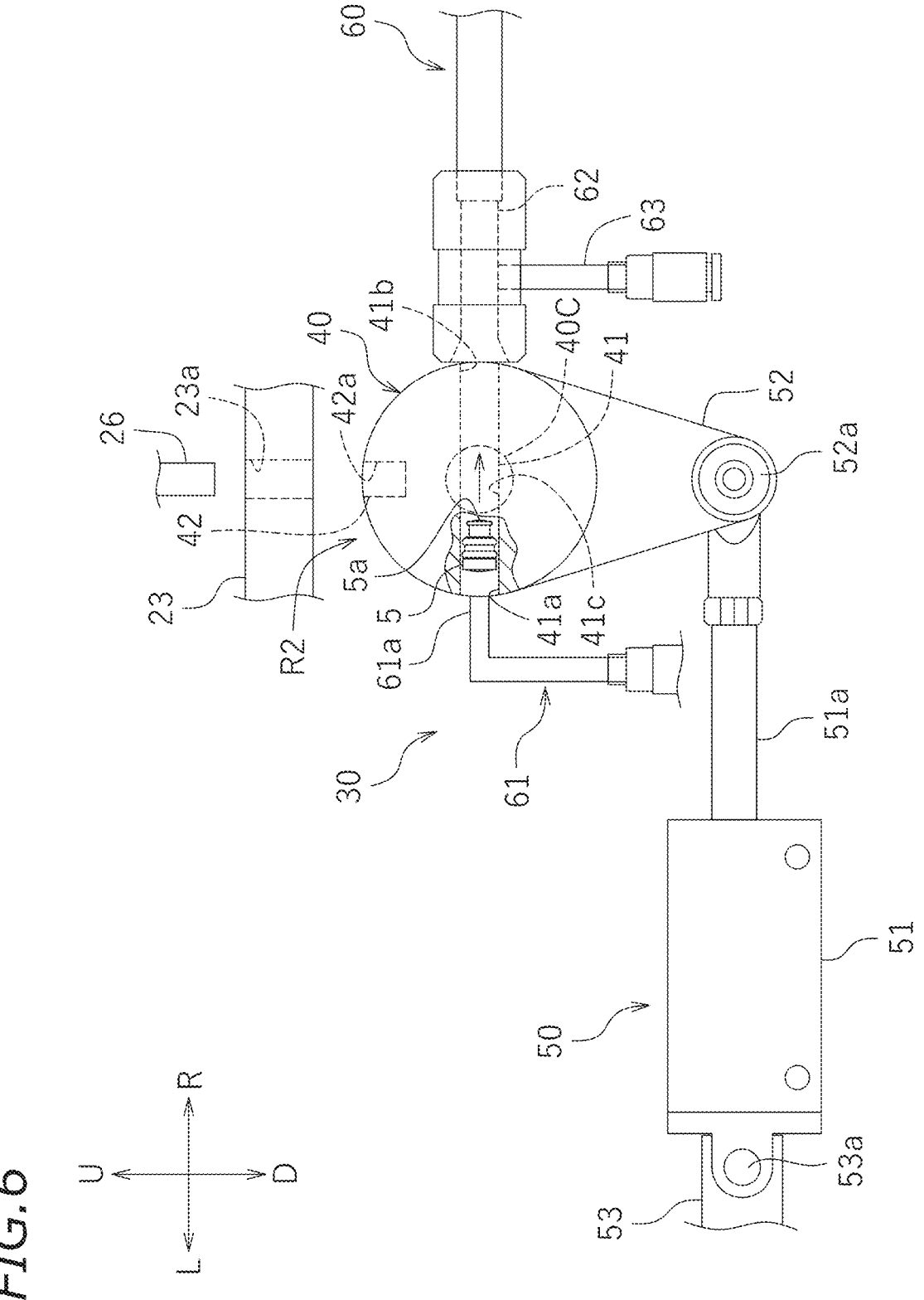
FIG. 6 is a partially-cutaway front view of the orientation adjustment device in the second rotation position.

The rotating body 40 moves between the first rotation position R1 shown in FIG. 4 and the second rotation position R2 shown in FIG. 6, driven by the driver device 50. FIG. 6 is a partially-cutaway front view of the orientation adjustment device 30 in the second rotation position R2. As shown in FIG. 4 and FIG. 6, the rotating body 40 is in the first rotation position R1 when the rod 51*a* of the actuator 51 is at the stroke end on the retracting side, and in the second rotation position R2 when the rod 51*a* is at the stroke end on the extending side. Note however that the first rotation position R1 and the second rotation position R2 of the rotating body 40 do not have to correspond to the opposite stroke ends of the rod 51*a* of the actuator 51. The first rotation position R1 and the second rotation position R2 of the rotating body 40 may be defined as the rotating body 40 abuts against the stopper, for example.

As shown in FIG. 4 and FIG. 6, in the present embodiment, the angular shift between the first rotation position R1 and the second rotation position R2 around the rotation shaft 40C is 90 degrees. The second rotation position R2 is a rotation position in which the rubber plug supply port 41*a* of the first accommodating portion 41 faces leftward and the rubber plug dispense port 41*b* faces rightward, as shown in FIG. 6. When the rotating body 40 is in the second rotation position R2, the rubber plug supply/eject port 42*a* of the second accommodating portion 42 faces upward, and is connected to the retaining hole 23*a* with the moving plate 23 being in the right end position. The second rotation position R2 is a rotation position that is reached by rotating the rotating body 40 by 90 degrees counterclockwise as viewed from the front side. As will be described below, herein, an air jet port 61*a* of the dispense device 60 is arranged leftward of the rotating body 40, and a dispense pipe 62 of the dispense device 60 is arranged rightward of the rotating body 40. Therefore, the rotation direction of the rotating body 40 when moving from the first rotation position R1 to the second rotation position R2 is such a rotation direction that the rubber plug supply port 41*a* of the first accommodating portion 41 moves closer to the air jet port 61*a* and the rubber plug dispense port 41*b* moves closer to the dispense pipe 62. The rotation direction of the rotating body 40 when moving from the first rotation position R1 to the second rotation position R2 is also a rotation direction in which the rubber plug supply/eject port 42*a* of the second accommodating portion 42 moves away from the dispense pipe 62 and moves closer to the retaining hole 23*a* of the dispense device 20.

The dispense device 60 dispenses the rubber plug 5 accommodated in the first accommodating portion 41 or the second accommodating portion 42 to the subsequent device from the first accommodating portion 41 or the second accommodating portion 42. As shown in FIG. 4, the dispense device 60 includes an air supply portion 61 arranged leftward of the rotating body 40, the dispense pipe 62 arranged rightward of the rotating body 40, and an ejector 63 connected to the dispense pipe 62. The air supply section 61 sends compressed air to the first accommodating portion 41 or the second accommodating portion 42 of the rotating body 40 for dispensing the rubber plug 5. The air supply section 61 includes the air jet port 61*a* that jets compressed air and a valve 61*b* (see FIG. 7) that controls the supply and stop of the compressed air. The air jet port 61*a* is provided adjacent to the rotating body 40 leftward of the rotating body 40, and jets compressed air toward the right side. As shown in FIG. 4, when the rotating body 40 is placed in the first rotation position R1, the air inlet port 43*a* of the air passage AP is connected to the air jet port 61*a*. When compressed air is jetted through the air jet port 61*a* in this state, the compressed air is jetted into the second accommodating portion 42 through the air outlet port 44*b* of the air passage AP via the air passage AP. As shown in FIG. 6, when the rotating body 40 is placed in the second rotation position R2, the rubber plug supply port 41*a* of the first accommodating portion 41 is connected to the air jet port 61*a*. When compressed air is jetted through the air jet port 61*a* in this state, the compressed air flows through the first accommodating portion 41 toward the rubber plug dispense port 41*b* (herein, rightward). The valve 61*b* is, for example, an electromagnetic valve and is controlled by the control device 100. Note however that there is no limitation on the type of the valve 61*b*.

The dispense pipe 62 is provided rightward of the rotating body 40 and adjacent to the rotating body 40. The dispense pipe 62 is a pipe through which the rubber plug 5 dispensed from the first accommodating portion 41 and the second accommodating portion 42 passes. The left end of the dispense pipe 62 is open and adjacent to the rotating body 40. As shown in FIG. 4, the dispense pipe 62 is connected to the rubber plug supply/eject port 42*a* of the second accommodating portion 42 when the rotating body 40 is placed in the first rotation position R1. When compressed air is jetted through the air jet port 61*a* in this state, the rubber plug 5 is dispensed from the second accommodating portion 42 into the dispense pipe 62 by the pressure of the compressed air (see also FIG. 10). The rubber plug 5 further moves inside the dispense pipe 62 and is supplied to the subsequent device. As shown in FIG. 6, the dispense pipe 62 is connected to the rubber plug dispense pipe 41*b* of the first accommodating portion 41 when the rotating body 40 is placed in the second rotation position R2. When compressed air is jetted through the air jet port 61*a* in this state, the rubber plug 5 is dispensed from the first accommodating portion 41 into the dispense pipe 62 by the pressure of the compressed air.

In summary, when the rotating body 40 is placed in the first rotation position R1, the rubber plug supply port 41*a* of the first accommodating portion 41 is connected to the supply device 20, the rubber plug supply/eject port 42*a* of the second accommodating portion 42 is connected to the dispense pipe 62 of the dispense device 60, and the air passage AP, which communicates with the second accommodating portion 42, is connected to the air jet port 61*a* of the dispense device 60. When the rotating body 40 is placed in the second rotation position R2, the rubber plug supply/eject port 42*a* of the second accommodating portion 42 is connected to the supply device 20, the rubber plug dispense port 41*b* of the first accommodating portion 41 is connected to the dispense pipe 62 of the dispense device 60, and the rubber plug supply port 41*a* of the first accommodating portion 41 is connected to the air jet port 61*a* of the dispense device 60. Note that in the present embodiment and variations, two members being "connected" means a functional connection, such as enabling the delivery of the rubber plug 5 or enabling the supply of the compressed air, and does not necessarily mean that the two members are in contact with each other.

The ejector 63 is a depressurization device that depressurizes the inside of the dispense pipe 62. The ejector 63 is herein a depressurization pump connected to the dispense pipe 62. When the ejector 63 is driven with the rotating body 40 located in the first rotation position R1 and the rubber plug 5 accommodated in the second accommodating portion 42, the rubber plug 5 is pulled toward the dispense pipe 62 by the negative pressure in the dispense pipe 62. When the ejector 63 is driven with the rotating body 40 located in the second rotation position R2 and the rubber plug 5 accommodated in the first accommodating portion 41, the rubber plug 5 is pulled toward the dispense pipe 62 by the negative pressure in the dispense pipe 62.

Figure 7:
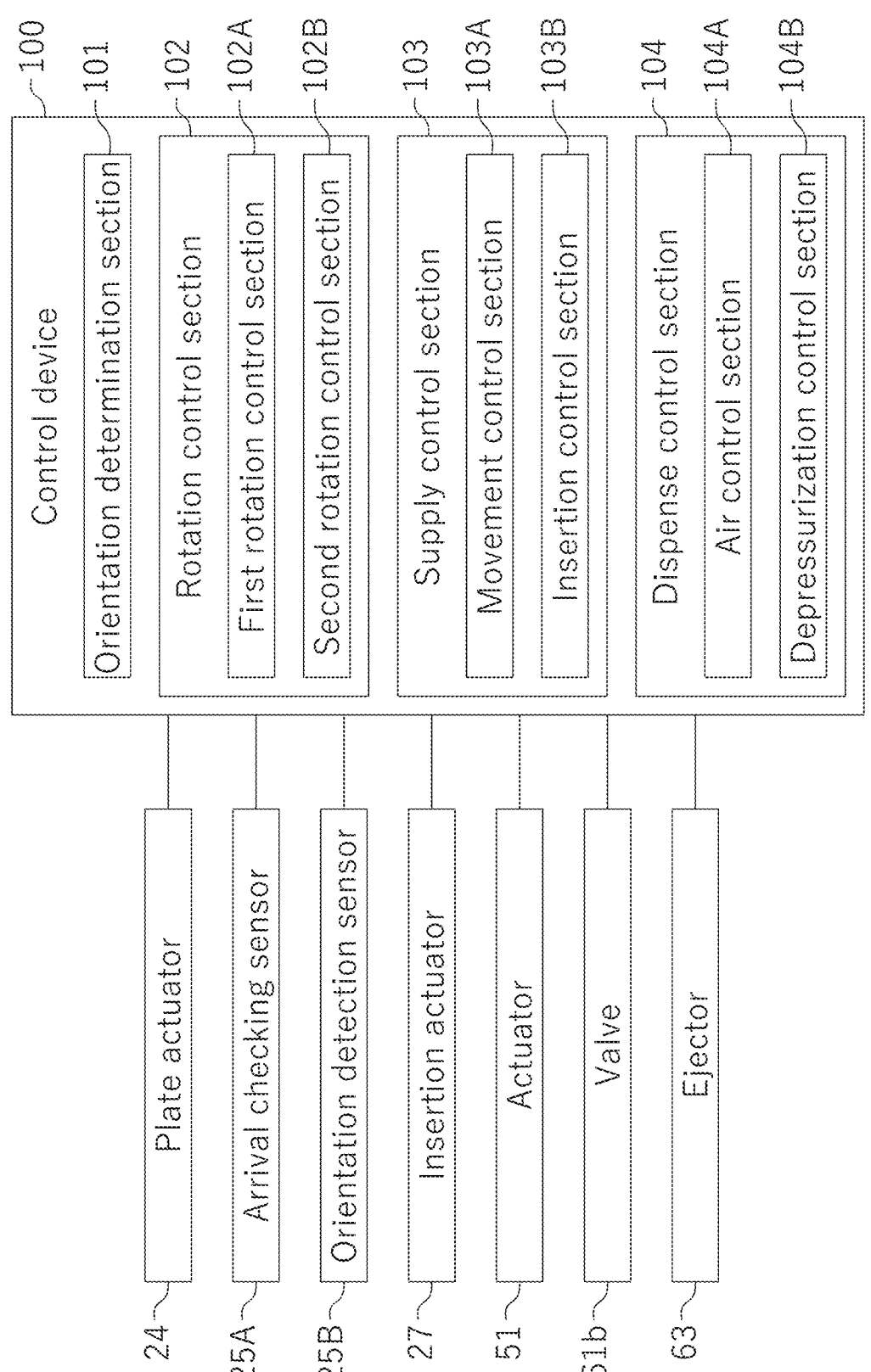
FIG. 7 is a block diagram of the rubber plug supply device.

FIG. 7 is a block diagram of the rubber plug supply device 10 according to the present embodiment. As shown in FIG. 7, connected to the control device 100 are the plate actuator 24 of the supply device 20, the arrival checking sensor 25A, the orientation detection sensor 25B, and the insertion actuator 27, the actuator 51 of the driver device 50, and the valve 61B and the ejector 63 of the dispense device 60. There is no particular limitation on the configuration of the control device 100. The control device 100 may include, for example, a central processing unit (hereinafter referred to as "CPU"), a ROM in which a program or the like to be executed by the CPU is stored, a RAM, etc. Each section of the control device 100 may be implemented by software or may be implemented by hardware. Each section may be a processor or may be a circuit. The control device 100 may be, for example, a programmable controller or a computer.

As shown in FIG. 7, the control device 100 includes an orientation determination section 101, a rotation control section 102, a supply control section 103, and a dispense control section 104. The orientation determination section 101 determines whether the orientation of the rubber plug 5 supplied to the orientation adjustment device 30 is the forward orientation or the reverse orientation, based on the detection of the sensor 25. The determination by the orientation determination section 101 is performed before the rubber plug 5 is supplied to the orientation adjustment device 30.

The rotation control section 102 includes a first rotation control section 102A and a second rotation control section 102B. If the sensor 25 detects that the orientation of the rubber plug 5 being supplied is the forward orientation, the first rotation control section 102A controls the driver device 50 so that the rotating body 40 is placed in the first rotation position R1, whereas if the sensor 25 detects that the orientation of the rubber plug 5 is the reverse orientation, the rotating body 40 is placed in the second rotation position R2. The control of rotating or not rotating (when the rotating body 40 is already in the target rotation position) the rotating body 40 by the rotation control section 102 is performed before the rubber plug 5 is accommodated in the first accommodating portion 41 or the second accommodating portion 42. After the rubber plug 5 is supplied to the first accommodating portion 41 or the second accommodating portion 42 by the supply control section 103, the second rotation control section 102B drives the driver device 50 so as to move the rotating body 40 from the first rotation position R1 to the second rotation position R2 or from the second rotation position R2 to the first rotation position R1.

The supply control section 103 includes a movement control section 103A and an insertion control section 103B. The movement control section 103A controls the plate actuator 24 to move the moving plate 23 in the left-right direction. The insertion control section 103B controls the insertion actuator 27 to move the insertion pin 26 in the up-down direction. After the rotating body 40 is placed in the first rotation position R1 or the second rotation position R2 by the first rotation control section 102A, the supply control section 103 controls the insertion actuator 27 of the supply device 20 to supply the rubber plug 5 to the first accommodating portion 41 or the second accommodating portion 42. The control of moving the moving plate 23 to the right end position may be performed before or after the rotating body 40 is placed in the first rotation position R1 or the second rotation position R2 by the first rotation control section 102A.

The dispense control section 104 includes an air control section 104A and a depressurization control section 104B. The air control section 104A controls the valve 61b to jet, or to stop jetting, the compressed air through the air jet port 61a. The depressurization control section 104B controls the ejector 63 to depressurize or stop depressurizing the inside of the dispense pipe 62. After the rotating body 40 is moved by the second rotation control section 102B, the dispense control section 104 controls the dispense device 60 to dispense the rubber plug 5 accommodated in the first accommodating portion 41 through the rubber plug dispense port

41b or the rubber plug 5 accommodated in the second accommodating portion 42 through the rubber plug supply/eject port 42a. Specifically, after the rotating body 40 is moved by the second rotation control section 102B, the dispense control section 104 controls the valve 61b of the dispense device 60 to supply compressed air into the first accommodating portion 41 or the second accommodating portion 42. Moreover, the dispense control section 104 drives the ejector 63 to depressurize the inside of the dispense pipe 62 when the rubber plug 5 accommodated in the first accommodating portion 41 or the second accommodating portion 42 is dispensed from the first accommodating portion 41 or the second accommodating portion 42.

[Supply Process]

Figure 8:
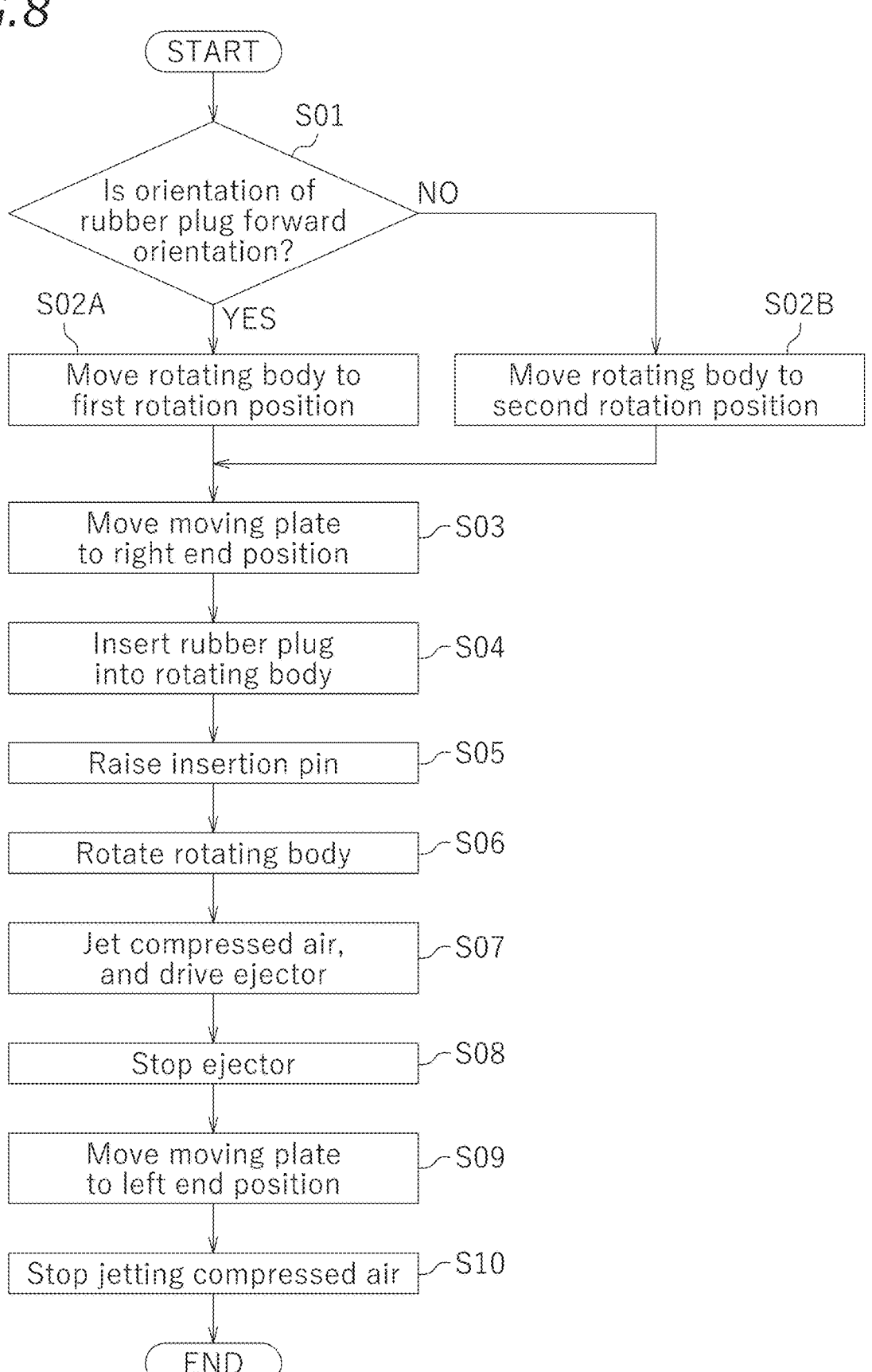
FIG. 8 is a flow chart showing an example of a rubber plug supply process.

The process of supplying the rubber plug 5 by the rubber plug supply device 10 will now be described. FIG. 8 is a flowchart showing an example of the process of supplying the rubber plug 5. As shown in FIG. 8, when supplying the rubber plug 5, the process first determines the orientation of the rubber plug 5 that has dropped from the supply vat 21 to be accommodated in the retaining hole 23a in step S01. If the orientation of the rubber plug 5 is the forward orientation (with the front end 5a facing forward in the direction of travel, herein downward) (when the result of step S01 is YES), the rotating body 40 is positioned in the first rotation position R1 in step S02A. If the orientation of the rubber plug 5 is the reverse orientation (with the rear end 5b facing forward in the direction of travel) (when the result of step S01 is NO), the rotating body 40 is positioned in the second rotation position R2 in step S02B. In step S03, the moving plate 23 is moved to the right end position. Step S03 may be performed prior to step S02A or S02B, or may be performed simultaneously with step S02A or S02B.

Figure 9:
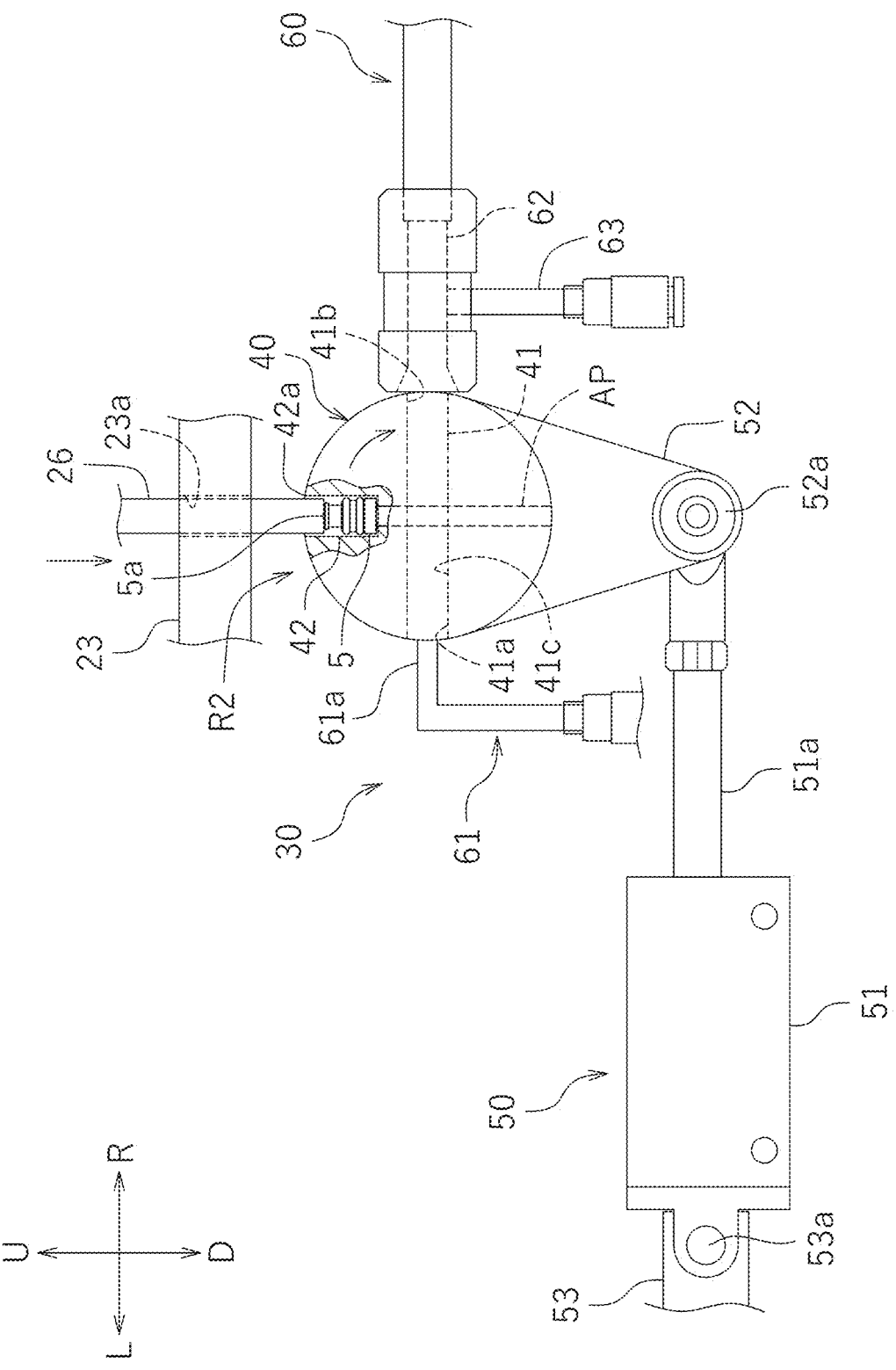
FIG. 9 is a partially-cutaway front view of an orientation adjustment device and a dispense device, showing a state at a point in time when a rubber plug is supplied to a second accommodating portion.

In step 504, the insertion pin 26 is lowered to push the rubber plug 5 into the first accommodating portion 41 or the second accommodating portion 42. If the orientation of the rubber plug 5 is the forward orientation (when the result of step S01 is YES), the rubber plug 5 is accommodated in the first accommodating portion 41. This state is shown in FIG. 4. If the orientation of the rubber plug 5 is the reverse orientation (when the result of step S01 is NO), the rubber plug 5 is accommodated in the second accommodating portion 42. This state is shown in FIG. 9. FIG. 9 is a partially-cutaway front view of the orientation adjustment device 30 and the dispense device 60, showing a state at a point in time when the rubber plug 5 is supplied to the second accommodating portion 42. In step S05, the insertion pin 26 is raised and pulled out of the first accommodating portion 41 or the second accommodating portion 42. Thus, the rotating body 40 is again in the rotatable state.

Figure 10:
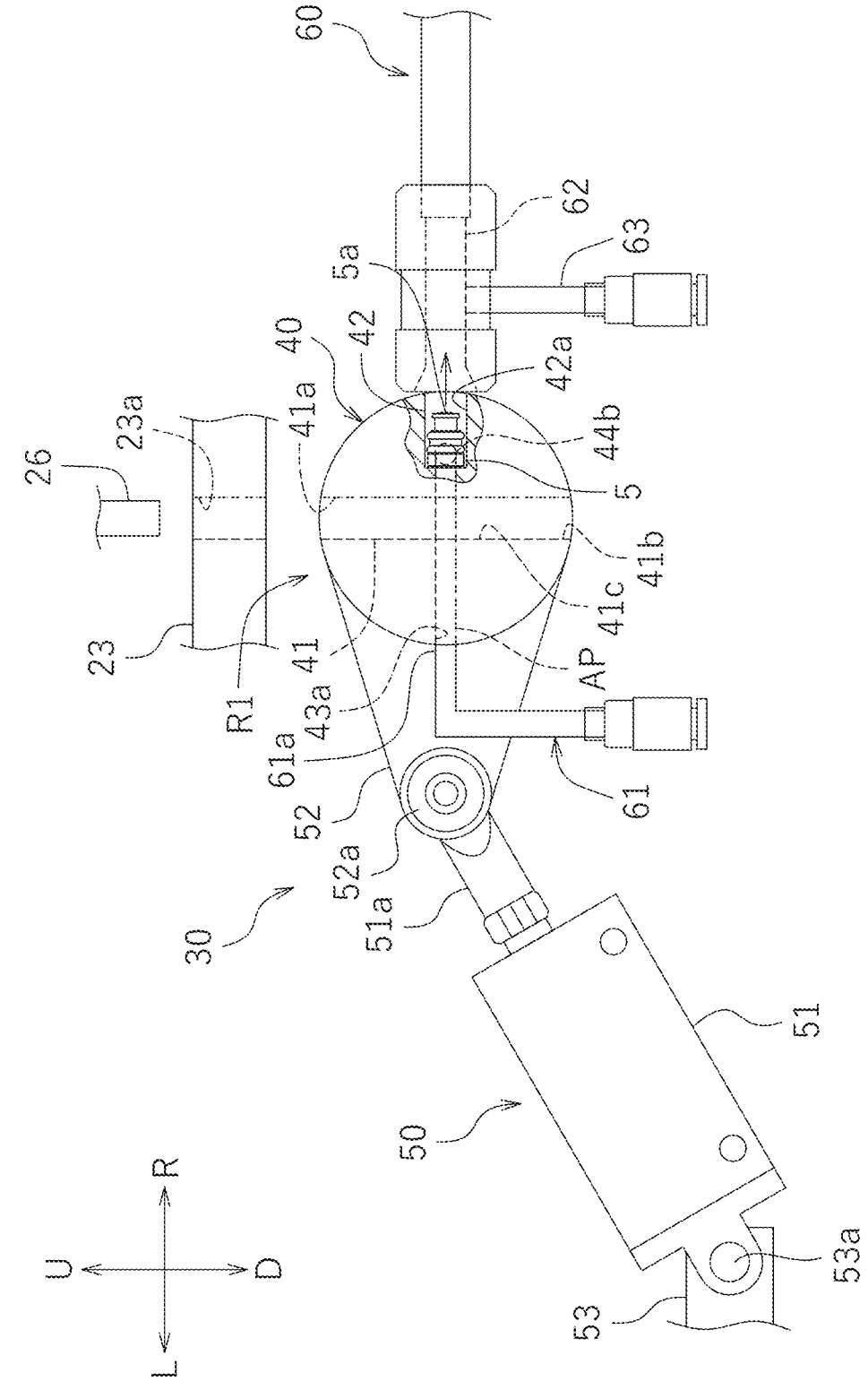
FIG. 10 is a partially-cutaway front view of the orientation adjustment device and the dispense device, showing a state after the rotating body has moved to the first rotation position.

In the following step S06, the rotating body 40 is rotated from the first rotation position R1 to the second rotation position R2 or from the second rotation position R2 to the first rotation position R1. When rotating the rotating body 40 from the first rotation position R1 to the second rotation position R2, the rotating body 40 is rotated 90 degrees counterclockwise as viewed from the front side. This state is shown in FIG. 6. When rotating the rotating body 40 from the second rotation position R2 to the first rotation position R1, the rotating body 40 is rotated 90 degrees clockwise as viewed from the front side. This state is shown in FIG. 10. FIG. 10 is a partially-cutaway front view of the orientation adjustment device 30 and the dispense device 60, showing a state after the rotating body 40 has moved to the first rotation position R1.

In the following step S07, the valve 61b is opened and compressed air is jetted through the air jet port 61a of the dispense device 60, and the ejector 63 is driven. As a result, in the case of FIG. 6, the rubber plug 5 is transported from the rubber plug dispense port 41*b* to the outside of the first accommodating portion 41 and moves into the dispense pipe 62. Thus, the rubber plug 5 moves out of the rotating body 40. In this process, as shown in FIG. 6, the rubber plug 5 has its front end 5*a* facing forward in the dispense direction. In the case of FIG. 10, the rubber plug 5 is transported from the rubber plug supply/eject port 42*a* to the outside of the second accommodating portion 42 and moves into the dispense pipe 62. Also in this process, as shown in FIG. 10, the rubber plug 5 still has its front end 5*a* facing forward in the dispense direction. That is, in step S07, the rubber plug 5 is dispensed with the orientation aligned in the forward orientation.

In step S08, the ejector 63 is stopped and the negative pressure in the dispense pipe 62 is released. In step S09, the moving plate 23 is returned to the left end position. Step S09 may be performed at any time between steps S06 to S08. After the rubber plug 5 moves out of the rotating body 40, the rotating body 40 may be allowed to rotate, and steps S01 to S05 are then performed for the next rubber plug 5 (not shown). Even if the rotation position of the rotating body 40 changes through step S02A or S02B for the next rubber plug 5, the rubber plug 5 continues to be transported through the dispense pipe 62 because compressed air jetted through the air jet port 61*a* flows through the dispense pipe 62. In step S10, the jetting of compressed air is stopped. Note however that compressed air may be jetted constantly during the process because the supply of rubber plug 5 to rotating body 40 by the supply device 20 is not affected even if compressed air is jetted.

Functions/Effects of First Embodiment

The rubber plug supply device 10 and the method of supplying the rubber plug 5 according to the present embodiment have been described above. Next, functions/effects to be realized by the rubber plug supply device 10 according to the present embodiment will be described.

With the rubber plug supply device 10 according to the present embodiment, the orientation of the rubber plug 5 is detected before the rubber plug 5 is accommodated in the rotating body 40. The rubber plug 5 is accommodated in the first accommodating portion 41 or the second accommodating portion 42 of the rotating body 40 depending on the detected orientation. The first accommodating portion 41 and the second accommodating portion 42 differ from each other in terms of the dispense direction of the rubber plug 5. The first accommodating portion 41 extends through the rotating body 40 so that the rubber plug 5 can be dispensed without changing the orientation of the rubber plug 5 as supplied. Moreover, in the present embodiment, the first rotation position R1 is the rubber plug 5 supply position for the first accommodating portion 41 and the rubber plug 5 dispense position for the second accommodating portion 42. The second rotation position R2 is the rubber plug 5 dispense position for the first accommodating portion 41 and the rubber plug 5 supply position for the second accommodating portion 42. Thus, with such a configuration, it is possible to align the orientation of the rubber plug 5 by moving the rotating body 40 between two positions, i.e., the first rotation position R1 and the second rotation position R2.

As described above, the conventional rubber plug supply device is not configured to switch between rubber plug accommodating portions depending on the orientation of the rubber plug as it is supplied to the rotating body. Therefore, the conventional rubber plug supply device needs to be configured so that the rotating body can take three positions, i.e., the first dispense position and the second dispense position, 180 degrees apart from each other, and the supply position. The three-position control of the rotating body is difficult to achieve without using an actuator capable of measuring the rotation angle or combining multiple actuators to make complex movements. Actuators capable of measuring the rotation angle, e.g., rotary actuators and servo motors, are expensive. Combining multiple actuators requires a complicated control and configuration. In contrast, the two-position control of the rotating body can be realized simply and at low cost by, for example, opposite stroke ends of one single-acting actuator, a stopper, etc. Thus, with such a configuration, it is possible to align the orientation of the rubber plug 5 with a simple and inexpensive configuration.

In the present embodiment, the driver device 50 includes the actuator 51 having the rod 51*a* that extends/retracts, the link member 52 that links between the rod 51*a* and the rotating body 40 so that the rod 51*a* is movable relative to the rotating body 40, and the support member 53 that supports the actuator 51 so that the actuator 51 can swing in response to the extension/retraction of the rod 51*a*. With such an embodiment, the rotating body 40 can be rotated by the simple actuator 51 having the rod 51*a* that extends/retracts. Using the simple actuator 51 having the rod 51*a* that extends/retracts can significantly reduce the cost of the driver device 50 compared to using a rotary actuator or a servo motor, for example.

In the present embodiment, the rotating body 40 is in the first rotation position R1 when the rod 51*a* of the actuator 51 is at one stroke end, and is in the second rotation position R2 when the rod 51*a* is at the other stroke end. With such a configuration, since the first rotation position R1 and the second rotation position R2 of the rotating body 40 can be determined using the stroke ends of the rod 51*a* of the actuator 51, it is possible to further simplify the configuration of the driver device 50.

In the present embodiment, the angular shift between the first rotation position R1 and the second rotation position R2 is 90 degrees. The angular shift between the rubber plug supply port 41*a* of the first accommodating portion 41 and the rubber plug supply/eject port 42*a* of the second accommodating portion 42 is also 90 degrees. Therefore, the position of the rubber plug supply port 41*a* when the rotating body 40 is in the first rotation position R1 and the position of the rubber plug supply/eject port 42*a* when the rotating body 40 is in the second rotation position R2 coincide with each other. The supply device 20 can hand over the rubber plugs 5 to the rotating body 40 always at the same position. Therefore, the configuration of the supply device 20 is simple. Moreover, in the present embodiment, the angular shift between the rubber plug supply port 41*a* and the rubber plug dispense port 41*b* of the first accommodating portion 41 is 180 degrees. Therefore, as shown in FIG. 6 and FIG. 10, the position of the rubber plug dispense port 41*b* when the rotating body 40 is in the second rotation position R2 and the position of the rubber plug supply/eject port 42*a* when the rotating body 40 is in the first rotation position R1 also coincide with each other. Therefore, only one dispense pipe 62 is needed for the rubber plug route of the dispense device 60. Note that the embodiment with two dispense pipes will be described below as a variation of the present embodiment.

In the present embodiment, the rotating body 40 includes the air inlet port 43a connected to the air jet port 61a when the rotating body 40 is placed in the first rotation position R1 and the air outlet port 44b connected to the second accommodating portion 42, and includes the air passage AP provided to extend avoiding the rubber plug passage 41c in the first accommodating portion 41. With such an air passage AP, compressed air for dispensing the rubber plug 5 can be supplied to the second accommodating portion 42. Moreover, since the first accommodating portion 41 and the air passage AP are not connected, when compressed air is supplied to one of the first accommodating portion 41 and the air passage AP, the compressed air does not flow to the other one of the first accommodating portion 41 and the air passage AP. Therefore, it is possible to prevent the compressed air dispense capacity from lowering, and to reduce the amount of wasted compressed air. In the present embodiment, as shown in FIG. 5, the air passage AP is bent three times to avoid the overlap of the air passage AP with the rubber plug passage 41c of the first accommodating portion 41.

In the present embodiment, the dispense device 60 includes the ejector 63 that depressurizes the inside of the dispense pipe 62. The rubber plug supply device 10 drives the ejector 63 when dispensing the rubber plug 5 from the first accommodating portion 41 or the second accommodating portion 42. With such a configuration, it is possible to reduce the amount of time required to carry the rubber plug 5 out of the first accommodating portion 41 or the second accommodating portion 42. In particular, the first accommodating portion 41 is long because it runs through the rotating body 40. Therefore, the amount of time required to carry the rubber plug 5 out of the first accommodating portion 41 becomes longer due to friction between the first accommodating portion 41 and the rubber plug 5. In the present embodiment, negative pressure is generated in the dispense pipe 62 by driving the ejector 63. This negative pressure assists the dispense of the rubber plug 5, and it is possible to reduce the amount of time required to carry the rubber plug 5 out of the first accommodating portion 41. Note that it is possible to similarly reduce the amount of time to carry the rubber plug 5 out of the second accommodating portion 42.

Other Embodiments

A preferred embodiment has been described above. However, the above embodiment is only one example, and various other embodiments are possible. Some variations will now be described. Note that in the following description of the variations, like reference signs are used for members of like functions to those of the embodiment described above. Redundant descriptions will be omitted or simplified as appropriate.

[First Variation]

Figure 11A:
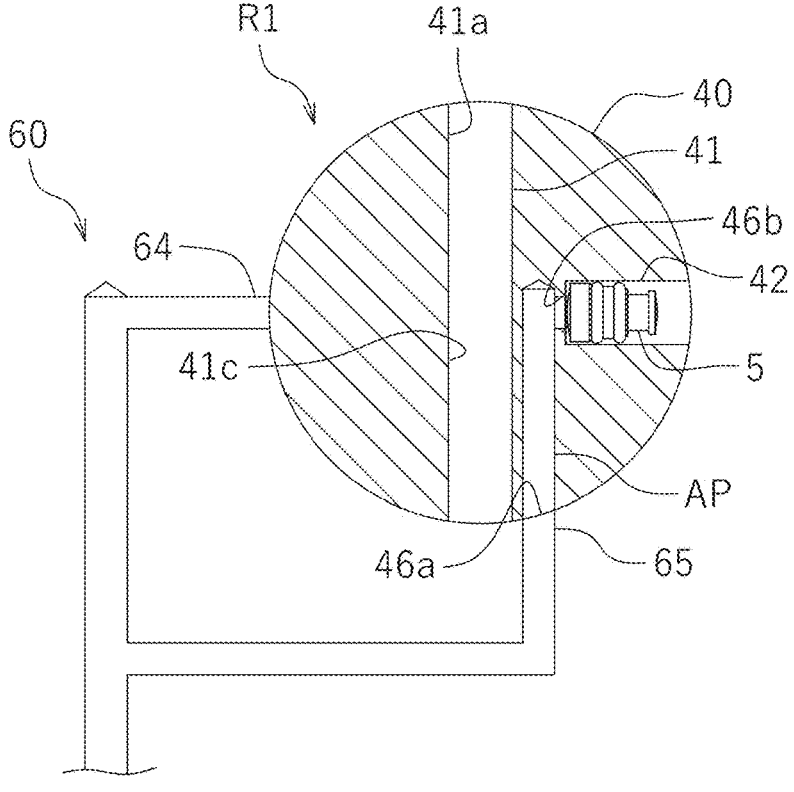
FIG. 11A is a cross-sectional view of a rotating body and a dispense device according to a first variation, showing a state where the rotating body is in the first rotation position.
Figure 11B:
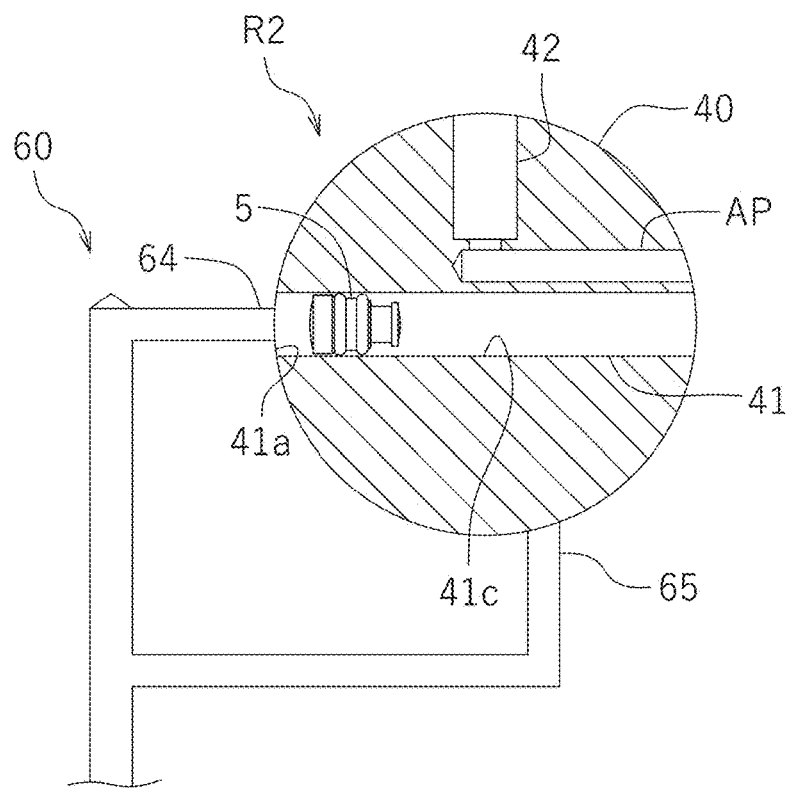
FIG. 11B is a cross-sectional view of the rotating body and the dispense device according to the first variation, showing a state where the rotating body is in the second rotation position.

In the first variation, the dispense device 60 includes two air jet ports. FIG. 11A and FIG. 11B are schematic cross-sectional views of the rotating body 40 and the dispense device 60 according to the first variation. FIG. 11A shows a state where the rotating body 40 is in the first rotation position R1. FIG. 11B shows a state where the rotating body 40 is in the second rotation position R2. As shown in FIG. 11A and FIG. 11B, in this variation, the dispense device 60 includes a first jet port 64 and a second jet port 65 configured to jet compressed air. As shown in FIG. 11B, the first jet port 64 is connected to the rubber plug supply port 41a of the first accommodating portion 41 when the rotating body 40 is placed in the second rotation position R2. As shown in FIG. 11A, the second jet port 65 is connected to the air inlet port 46a of the air passage AP when the rotating body 40 is placed in the first rotation position R1. The air passage AP includes the air inlet port 46a connected to the second jet port 65 when the rotating body 40 is placed in the first rotation position R1 and an air outlet port 46b connected to the second accommodating portion 42.

With such a configuration, the structure of the air passage AP can be simplified because the compressed air is supplied to the first accommodating portion 41 and the second accommodating portion 42 from different systems. For example, the structure of the air passage AP is likely to become complicated when using a single system of compressed air as in the first embodiment and providing the air passage AP to extend avoiding the rubber plug passage 41c of the first accommodating portion 41. As shown in FIG. 5, in the first embodiment, the air passage AP is formed over the holder 40A and the rotary shaft 40B and is bent three times. However, when the system for supplying compressed air to the second accommodating portion 42 is separated from the system for supplying compressed air to the first accommodating portion 41, as in this variation, it is no longer necessary to provide a special structure in the air passage AP to avoid the rubber plug passage 41c in the first accommodating portion 41. Therefore, it is possible to avoid complicating the structure of the rotating body 40. In this variation, the air passage AP is a generally straight passage that is bent only once immediately before the air outlet port 46b. Note that it is also possible to form the air passage AP straight.

[Second Variation]

Figure 12A:
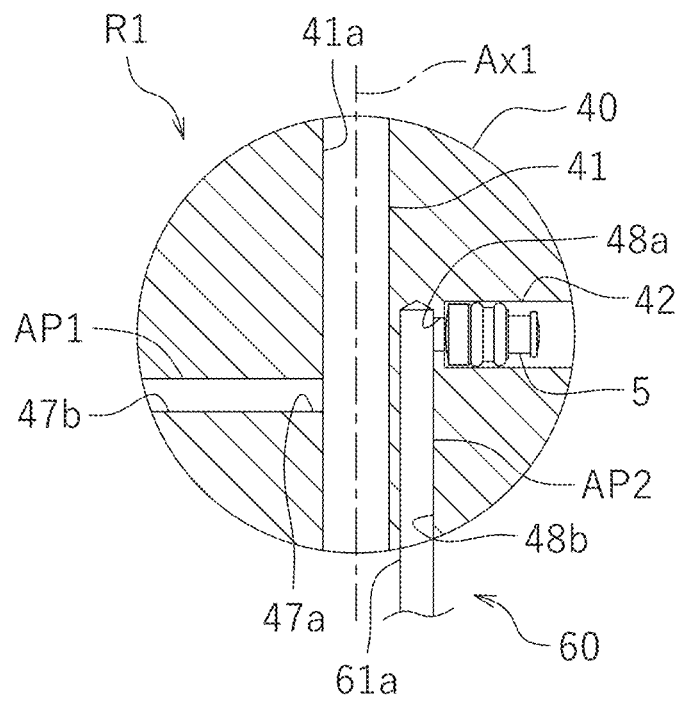
FIG. 12A is a cross-sectional view of a rotating body and dispense device according to a second variation, showing a state where the rotating body is in the first rotation position.
Figure 12B:
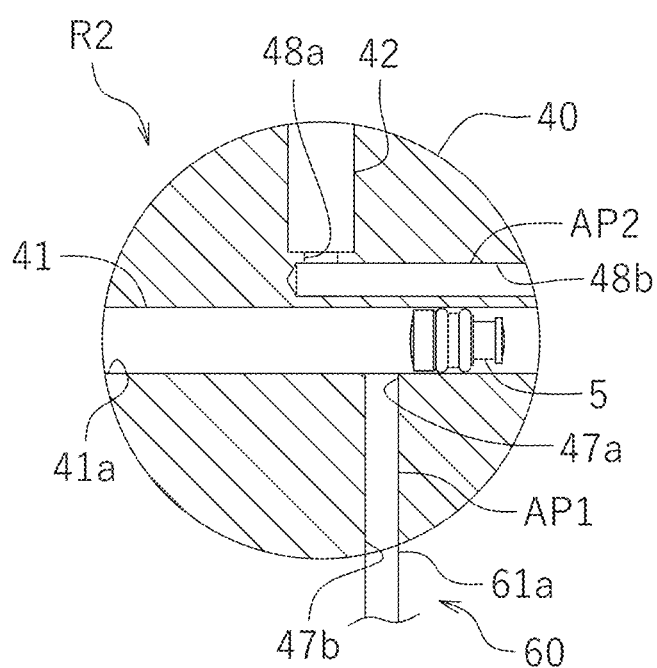
FIG. 12B is a cross-sectional view of the rotating body and the dispense device according to the second variation, showing a state where the rotating body is in the second rotation position.

FIG. 12A and FIG. 12B are schematic cross-sectional views of the rotating body 40 and dispense device 60 according to the second variation. FIG. 12A shows a state where the rotating body 40 is in the first rotation position R1. FIG. 12B shows a state where the rotating body 40 is in the second rotation position R2. As shown in FIG. 12A and FIG. 12B, in this variation, the rotating body 40 includes a first air passage AP1 for supplying compressed air to the first accommodating portion 41 and a second air passage AP2 for supplying compressed air to the second accommodating portion 42. One end 47a of the first air passage AP1 is connected to the first accommodating portion 41. The other end 47b of the first air passage AP1 has an opening in the peripheral portion of the rotating body 40. The other end 47b of the first air passage AP1 is connected to the air jet port 61a when the rotating body 40 is placed in the second rotation position R2, as shown in FIG. 12B. The first air passage AP1 is a straight passage provided to be orthogonal to the axis Ax1 of the first accommodating portion 41. One end 48a of the second air passage AP2 is connected to the second accommodating portion 42. The other end 48b of the second air passage AP2 has an opening in the peripheral portion of the rotating body 40. The other end 48b of the second air passage AP2 is connected to the air jet port 61a when the rotating body 40 is placed in the first rotation position R1, as shown in FIG. 12A. The second air passage AP2 is a generally straight passage (only a portion that is closest to the second accommodating portion 42 extends orthogonal to the axis Ax1 of the first accommodating portion 41) provided generally in parallel with the axis Ax1 of the first accommodating portion 41. The first air passage AP1 is provided such that the position of the end portion 47b of the first air passage AP1 when the rotating body 40 is in the second rotation position R2 coincides with the position of the end portion 48*b* of the second air passage AP2 when the rotating body 40 is in the first rotation position R1.

With such a configuration, unlike the configuration in which compressed air is supplied to the first accommodating portion 41 through the rubber plug supply port 41*a* as in the first embodiment, the end portion 47*b* of the first air passage AP1, which is the inlet of the compressed air, can be arranged relatively freely. Therefore, it is possible to arrange the end portion 47*b* of the first air passage AP1 so that the structure of the second air passage AP2 is simplified. There-fore, it is possible to avoid complicating the structure of the rotating body 40 and only one system can be used for supplying compressed air. In this variation, the end portion 47*b* of the first air passage AP1 is positioned so that the second air passage AP2 is a generally straight passage.

[Third Variation]

Figure 13A:
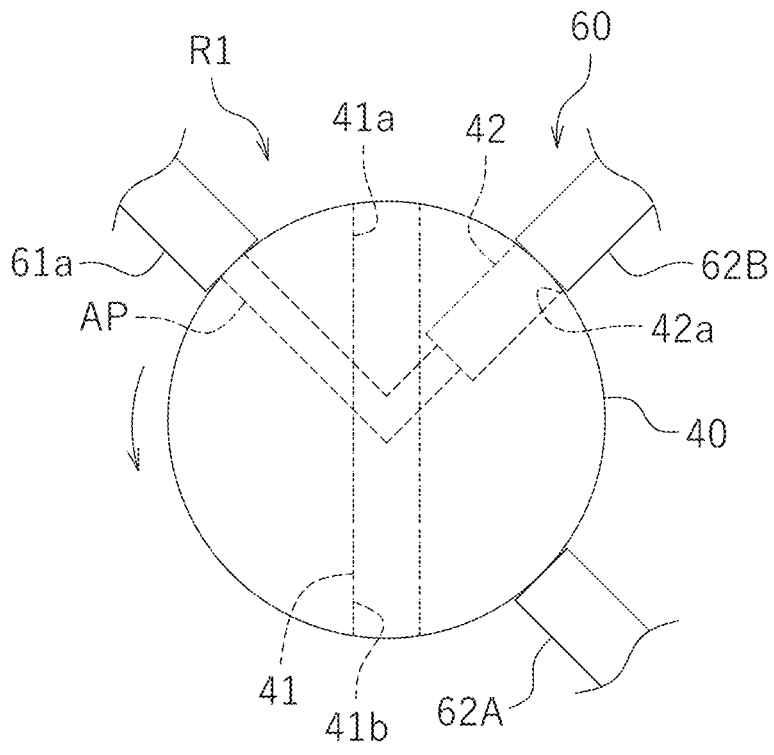
FIG. 13A is a front view of a rotating body and a dispense device according to a third variation, showing a state where the rotating body is in the first rotation position.
Figure 13B:
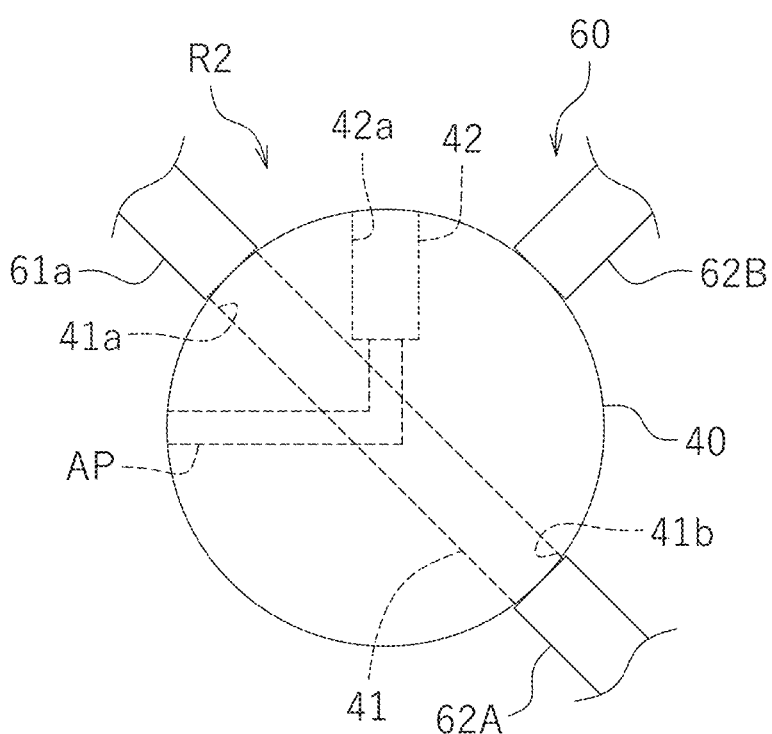
FIG. 13B is a front view showing the rotating body and the dispense device according to the third variation, showing a state where the rotating body is in the second rotation position.

FIG. 13A and FIG. 13B are front views of the rotating body 40 and the dispense device 60 according to the third variation. FIG. 13A shows a state where the rotating body 40 is in the first rotation position R1. FIG. 13B shows a state where the rotating body 40 is in the second rotation position R2. As shown in FIG. 13A and FIG. 13B, in this variation, the angular shift between the first rotation position R1 and the second rotation position R2 is less than 90 degrees. The angular shift between the first rotation position R1 and the second rotation position R2 is 45 degrees, for example. Note however that the angular shift between the first rotation position R1 and the second rotation position R2 is not limited to 45 degrees. In this variation, the position of the rubber plug dispense port 41*b* when the rotating body 40 is in the second rotation position R2 does not coincide with the position of the rubber plug supply/eject port 42*a* when the rotating body 40 is in the first rotation position R1. In order to correspond to this, the dispense device 60 includes two dispense pipes 62A and 62B. As shown in FIG. 13B, the first dispense pipe 62A is connected to the rubber plug dispense port 41*b* of the first accommodating portion 41 when the rotating body 40 is in the second rotation position R2. As shown in FIG. 13A, the second dispense pipe 62B is connected to the rubber plug supply/eject port 42*a* of the second accommodating portion 42 when the rotating body 40 is in the first rotation position R1. Thus, the dispense device 60 may be connected to the rubber plug dispense port 41*b* of the first accommodating portion 41 and the rubber plug supply/eject port 42*a* of the second accommodating portion 42 respectively by the two dispense pipes 62A and 62B. With such a configuration, the angle of rotation of the rotating body 40 is small because the angular shift between the first rotation position R1 and the second rotation position R2 is smaller than 90 degrees. Therefore, it is possible to reduce the cycle time for aligning the orientation of the rubber plugs 5.

Note that in the above variation, the position of the rubber plug dispense port 41*b* when the rotating body 40 is in the second rotation position R2 and the position of the rubber plug supply/eject port 42*a* when the rotating body 40 is in the first rotation position R1 do not coincide with each other, but they may coincide with each other. In that case, there may be one dispense pipe 62. Note however that in such a variation, the position of the rubber plug supply port 41*a* when the rotating body 40 is in the first rotation position R1 does not coincide with the position of the rubber plug supply/eject port 42*a* when the rotating body 40 is in the second rotation position R2. For example, in such a case, the moving plate 23 (see FIG. 1) may be moved to a position where the rubber plug 5 is supplied to the first accommo-dating portion 41 or a position where the rubber plug 5 is supplied to the second accommodating portion 42, depend-ing on the orientation of the rubber plug 5.

[Fourth Variation]

Figure 14A:
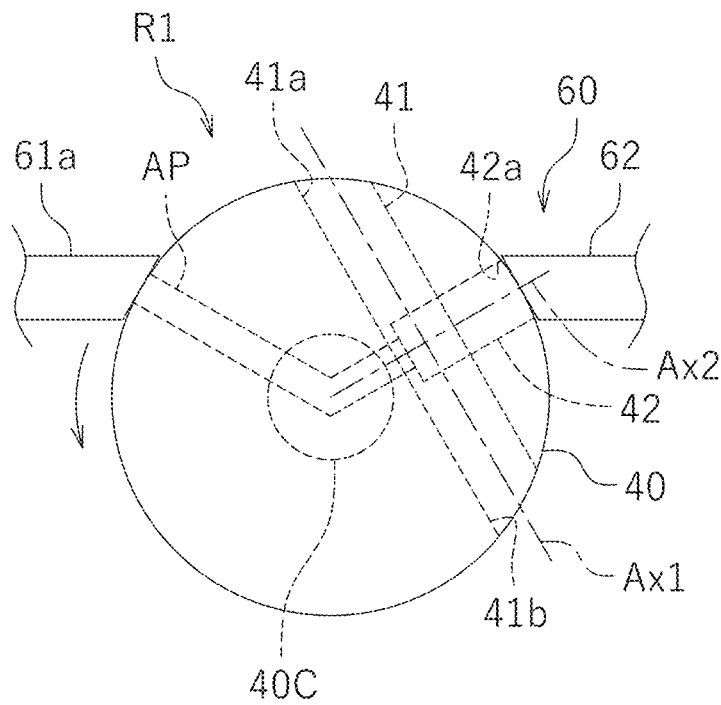
FIG. 14A is a front view showing a rotating body and a dispense device according to a fourth variation, showing a state where the rotating body is in the first rotation position.
Figure 14B:
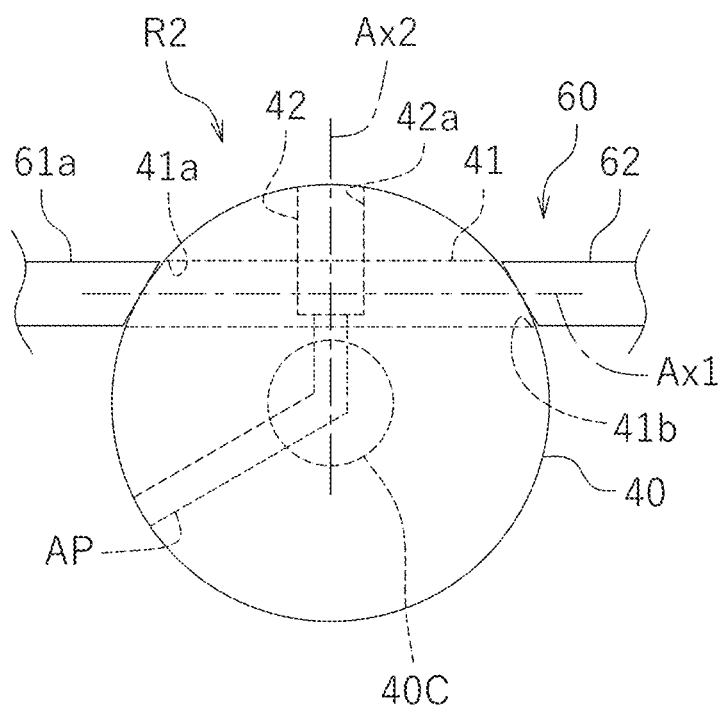
FIG. 14B is a front view showing the rotating body and the dispense device according to the fourth variation, showing a state where the rotating body is in the second rotation position.

In the fourth variation, the angular shift between the first rotation position R1 and the second rotation position R2 is smaller than 90 degrees, and there is one position at which the supply device 20 supplies the rubber plug 5 and there is one dispense pipe 62. FIG. 14A and FIG. 14B are front views of the rotating body 40 and the dispense device 60 according to the fourth variation. FIG. 14A shows a state where the rotating body 40 is in the first rotation position R1. FIG. 14B shows a state where the rotating body 40 is in the second rotation position R2. The description of this variation is a case where the angular shift between the first rotation position R1 and the second rotation position R2 is 60 degrees. Note however that the angular shift between the first rotation position R1 and the second rotation position R2 is not limited to 60 degrees.

As shown in FIG. 14A and FIG. 14B, in this variation, the first accommodating portion 41 is configured so as not to pass through the center of the rotating body 40 (which coincides with the rotation shaft 40C). As shown in FIG. 14A, when the rotating body 40 is in the first rotation position R1, the rubber plug supply port 41A of the first accommodating portion 41 faces upward (the 0 o'clock direction). Then, the rubber plug dispense port 41*b* of the first accommodating portion 41 is facing the 4 o'clock direction. Herein, the angular shift between the rubber plug supply port 41*a* and the rubber plug dispense port 41*b* around the rotation shaft 40C is 120 degrees, not 180 degrees. When the rotating body 40 is in the first rotation position R1, the rubber plug supply/eject port 42*a* of the second accommodating portion 42 is facing the 2 o'clock direction. The angular shift between the rubber plug supply port 41*a* and the rubber plug supply/eject port 42*a* around the rotation shaft 40C is herein 60 degrees, not 90 degrees. The rubber plug supply/eject port 42*a* of the second accom-modating portion 42 is located at the center between the rubber plug supply port 41*a* and the rubber plug dispense port 41*b* of the first accommodating portion 41 with respect to the angle of rotation around the rotation shaft 40C. The rubber plug supply port 41*a* and the rubber plug dispense port 41*b* of the first accommodating portion 41 are sym-metrical relative to the rubber plug supply/eject port 42*a* of the second accommodating portion 42 with respect to the rotation position around the rotation shaft 40C.

As shown in FIG. 14A, when the rotating body 40 is in the first rotation position R1, the dispense pipe 62 is connected to the rubber plug supply/eject port 42*a* of the second accommodating portion 42. The dispense pipe 62 is pro-vided in the 2 o'clock direction of the rotating body 40. In this variation, the air jet port 61*a* is provided in the 10 o'clock direction of the rotating body 40. The air jet port 61*a* is shifted 60 degrees counterclockwise from the 0 o'clock direction of the rotating body 40, and the dispense pipe 62 is provided being shifted 60 degrees clockwise from the 0 o'clock direction of the rotating body 40. The air passage AP, which communicates with the second accommodating portion 42, is provided so as to be connected to the air jet port 61*a* when the rotating body 40 is in the first rotation position R1. Thus, in the state of FIG. 14A, the rubber plug 5 (not shown) in the second accommodating portion 42 can be dispensed to the dispense pipe 62. It is possible to insert the rubber plug 5 into the first accommodating portion 41 through the rubber plug supply port 41*a*.

As shown in FIG. 14B, when the rotating body 40 is rotated 60 degrees counterclockwise to the second rotation position R2, the rubber plug supply/eject port 42*a* of the
second accommodating portion 42 moves 60 degrees coun-
terclockwise around the rotation shaft 40C to the 0 o'clock
direction of the rotating body 40. Thus, it is possible to insert
the rubber plug 5 into the second accommodating portion 42
through the rubber plug supply/eject port 42*a*. At the same
time, the rubber plug dispense port 41*b* of the first accom-
modating portion 41 also moves 60 degrees counterclock-
wise around the rotation shaft 40C to the position where the
rubber plug supply/eject port 42*a* of the second accommo-
dating portion 42 was located when the rotating body 40 was
in the first rotation position R1 (the 2 o'clock position of the
rotating body 40). As a result, the dispense pipe 62 is
connected to the rubber plug dispense port 41*b*. Moreover,
the rubber plug supply port 41*a* of the first accommodating
portion 41 also moves 60 degrees counterclockwise around
the rotation shaft 40C to the position where the end portion
of the air passage AP was located when the rotating body 40
was in the first rotation position R1 (the 10 o'clock position
of the rotating body 40). Thus, the air jet port 61*a* is
connected to the rubber plug supply port 41*a*. Therefore,
when the rotating body 40 is moved to the second rotation
position R2, the rubber plug 5 (not shown) in the first
accommodating portion 41 can be dispensed to the dispense
pipe 62.

Thus, if the rubber plug supply port 41*a* and the rubber
plug dispense port 41*b* of the first accommodating portion
41 are provided in symmetry relative to the rubber plug
supply/eject port 42*a*, the position of the rubber plug dis-
pense port 41*b* when the rotating body 40 is in the second
rotation position R2 and the position of the rubber plug
supply/eject port 42*a* when the rotating body 40 is in the first
rotation position R1 can be matched, regardless of the
angular shift between the first rotation position R1 and the
second rotation position R2. Thus, the rubber plug route of
the dispense device 60 can be only a single dispense pipe 62.
Note that in this variation, as shown in FIG. 14B, the air jet
port 61*a* and dispense pipe 62 are provided to be connected
straight to the first accommodating portion 41 when the
rotating body 40 is in the second rotation position R2, but
this may not be the case. The air jet port 61*a* and the dispense
pipe 62 may be provided at an angle such that it is possible
to easily dispense both the rubber plug 5 in the first accom-
modating portion 41 and the rubber plug 5 in the second
accommodating portion 42. In such a case, the first accom-
modating portion 41 does not need to be a straight hole and
may be bent to be smoothly connected to the air jet port 61*a*
and the dispense pipe 62.

One preferred embodiment and some variations thereof
have been described above. However, various other embodi-
ments are possible in addition to the embodiments described
above. For example, while the angular shift between the first
rotation position R1 and the second rotation position R2 is
90 degrees or less than 90 degrees in the embodiment
described above, but the angular shift may be greater than 90
degrees. The angular shift between the first rotation position
R1 and the second rotation position R2 may be greater than
90 degrees and less than 180 degrees, for example.

While the dispense device 60 dispenses the rubber plug 5
by using compressed air or depressurization of the inside of
the dispense pipe 62 in the embodiment described above,
there is no particular limitation on the method of dispensing
the rubber plug 5. The rubber plug 5 may, for example, be
dispensed by using pressure by a pin or the like or by using
the action of gravity. Similarly, there is no limitation on the
method of supplying the rubber plug 5 to the rotating body
40.

While the rubber plug 5 is supplied in the embodiment
described above, the object to be supplied does not need to
be a rubber plug. The object to be supplied may be any
columnar or cylindrical part. Preferably, the object to be
supplied may be a part, wherein the shape at one end of the
part in the axial direction is asymmetric with the shape at the
other end of the part.

DESCRIPTION OF REFERENCE SIGNS

5 Rubber plug
10 Rubber plug supply device
20 Supply device
25 Sensor
40 Rotating body
40C Rotation shaft
41 First accommodating portion
41*a* Rubber plug supply port
41*b* Rubber plug dispense port
41*c* Rubber plug passage
42 Second accommodating portion
42*a* Rubber plug supply/eject port
43*a* Air inlet port (first end portion)
44*b* Air outlet port (second end portion)
50 Driver device
51 Actuator
51*a* Rod
52 Link member
53 Support member
60 Dispense device
61*a* Air jet port
62 Dispense pipe
63 Ejector (depressurization device)
100 Control device
102A First rotation control section
102B Second rotation control section
103 Supply control section
104 Dispense control section
AP Air passage
R1 First rotation position
R2 Second rotation position

The invention claimed is:
1. A rubber plug supply device, comprising:
a supply device to supply a rubber plug;
a sensor in the supply device to determine whether an
orientation of the rubber plug is a first orientation or a
second orientation, which is opposite to the first ori-
entation;
a rotating body including a rotation shaft and a first
accommodating portion and a second accommodating
portion each able to accommodate the rubber plug
supplied from the supply device;
a driver device to rotate the rotating body around the
rotation shaft;
a dispense device to dispense the rubber plug accommo-
dated in the first accommodating portion or the second
accommodating portion; and
a controller connected to the supply device, the sensor, the
driver device and the dispense device, wherein:
the first accommodating portion includes:
a rubber plug supply port connected to the supply
device when the rotating body is in a first rotation
position around the rotation shaft;
a rubber plug dispense port connected to the dispense
device when the rotating body is in a second rotation
position around the rotation shaft; and a rubber plug passage configured to allow the rubber plug to pass therethrough and to connect the rubber plug supply port to the rubber plug dispense port;

the second accommodating portion includes a rubber plug supply/eject port connected to the dispense device when the rotating body is in the first rotation position and connected to the supply device when the rotating body is in the second rotation position; and the controller is configured to perform:

a first rotation control to place the rotating body in the first rotation position when it is detected by the sensor that the orientation of the rubber plug is the first orientation, and to place the rotating body in the second rotation position when it is detected that the orientation of the rubber plug is the second orientation;

a supply control to supply the rubber plug to the first accommodating portion or the second accommodating portion after the rotating body is placed in the first rotation position or the second rotation position by the first rotation control;

a second rotation control to move the rotating body to the second rotation position or the first rotation position after the rubber plug is supplied to the first accommodating portion or the second accommodating portion; and a dispense control to, after the rotating body is moved by the second rotation control, dispense the rubber plug accommodated in the first accommodating portion through the rubber plug dispense port or dispense the rubber plug accommodated in the second accommodating portion through the rubber plug supply/eject port.

2. The rubber plug supply device according to claim 1, wherein:

the driver device includes:

an actuator including a rod that extends and retracts;

a link member linking the rod and the rotating body so that the rod is movable relative to the rotating body; and a support member to support the actuator so that the actuator can swing or move in response to extension and retraction of the rod.

3. The rubber plug supply device according to claim 2, wherein the rotating body is in the first rotation position when the rod is at one stroke end, and is in the second rotation position when the rod is at the other stroke end.

4. The rubber plug supply device according to claim 1, wherein an angular shift of the rotating body around the rotation shaft between the first rotation position and the second rotation position is 90 degrees or less.

5. The rubber plug supply device according to claim 4, wherein:

an angular shift of the rotating body around the rotation shaft between the first rotation position and the second rotation position is 90 degrees;

an angular shift of the rotating body around the rotation shaft between the rubber plug supply port and the rubber plug supply/eject port is 90 degrees; and an angular shift of the rotating body around the rotation shaft between the rubber plug supply port and the rubber plug dispense port is 180 degrees.

6. The rubber plug supply device according to claim 5, wherein the dispense device includes a dispense pipe connected to the rubber plug supply/eject port of the second accommodating portion when the rotating body is in the first rotation position, and connected to the rubber plug dispense port of the first accommodating portion when the rotating body is in the second rotation position.

7. The rubber plug supply device according to claim 1, wherein:

the dispense device further includes an air jet port to jet compressed air;

the rubber plug supply port of the first accommodating portion is connected to the air jet port when the rotating body is in the second rotation position; and the rotating body includes an air passage including a first end portion connected to the air jet port when the rotating body is in the first rotation position and a second end portion connected to the second accommodating portion, wherein the air passage avoids the rubber plug passage of the first accommodating portion.

8. The rubber plug supply device according to claim 1, wherein:

the dispense device includes a first jet port and a second jet port each configured to jet compressed air;

the first jet port is connected to the rubber plug supply port of the first accommodating portion when the rotating body is in the second rotation position; and the rotating body includes an air passage including a first end portion connected to the second jet port when the rotating body is in the first rotation position and a second end portion connected to the second accommodating portion.

9. The rubber plug supply device according to claim 1, wherein:

the dispense device includes an air jet port configured to jet compressed air; and the rotating body includes:

a first air passage one end of which is connected to the first accommodating portion, wherein the other end is connected to the air jet port when the rotating body is in the second rotation position; and a second air passage one end of which is connected to the second accommodating portion, wherein the other end is connected to the air jet port when the rotating body is in the first rotation position.

10. The rubber plug supply device according to claim 1, wherein:

the dispense device includes:

a dispense pipe connected to the rubber plug dispense port of the first accommodating portion when the rotating body is in the second rotation position, and through which the rubber plug dispensed from the first accommodating portion passes; and a depressurization device to depressurize an inside of the dispense pipe, wherein the controller, in the dispense control, drives the depressurization device when dispensing the rubber plug accommodated in the first accommodating portion from the first accommodating portion.

11. The rubber plug supply device according to claim 1, wherein the rubber plug supply port and the rubber plug dispense port are symmetrical relative to the rubber plug supply/eject port with respect to the rotation position around the rotation shaft.

* * * * *